(12) United States Patent
Rajagopalan et al.

(10) Patent No.: US 8,761,363 B2
(45) Date of Patent: Jun. 24, 2014

(54) METHODS AND SYSTEMS FOR AUTOMATIC FORWARDING OF COMMUNICATIONS TO A PREFERRED DEVICE

(75) Inventors: Mahesh Rajagopalan, Irving, TX (US); Nagendra Kunuturi, Irving, TX (US); Craig L. Reding, Midland Park, NJ (US); Jagmit Singh, Mound, TX (US); Christopher L. Helbling, Stamford, CT (US)

(73) Assignees: Verizon Data Services LLC, Temple Terrace, FL (US); Telesctor Resource Group, Inc., New York, NY (US)

( * ) Notice: Subject to any disclaimer, the term of this patent is extended or adjusted under 35 U.S.C. 154(b) by 1048 days.

(21) Appl. No.: 10/720,633

(22) Filed: Nov. 24, 2003

(65) Prior Publication Data

US 2006/0177030 A1 Aug. 10, 2006

Related U.S. Application Data

(63) Continuation-in-part of application No. 10/083,793, filed on Feb. 27, 2002, and a continuation-in-part of application No. 10/083,792, filed on Feb. 27, 2002, now Pat. No. 7,142,646, and a continuation-in-part of application No. 10/083,884, filed on Feb. 27, 2002, now Pat. No. 7,190,773, and a continuation-in-part of application No. 10/083,822, filed on Feb. 27, 2002.

(Continued)

(51) Int. Cl.
*H04M 1/56* (2006.01)
*H04M 3/42* (2006.01)

(52) U.S. Cl.
USPC .............................. 379/142.07; 379/207.08

(58) Field of Classification Search
USPC ............. 379/211.01, 207.04, 212.01, 142.07; 455/458, 440; 370/349, 353, 352; 709/227
See application file for complete search history.

(56) References Cited

U.S. PATENT DOCUMENTS 4,013,839 A 3/1977 Bell
4,540,850 A 9/1985 Herr et al. .................. 379/88.19

(Continued)

FOREIGN PATENT DOCUMENTS

CA 2240878 12/1998
DE 10110942 9/2002

(Continued)

OTHER PUBLICATIONS

"MP3 Recorder Download—MP3 Recorder—Record Audio Stream to MP3 or WAV," 2002, http://www.mp3-recorder.net.

(Continued)

*Primary Examiner* — Sonia Gay

(57) ABSTRACT

Methods and systems for routing a communication to a preferred device are disclosed. A service center consistent with the present invention is operable to receive information pertaining to a communication to a user from a calling party, and retrieve data corresponding to the user using the received information. The service center also determines a preferred device of the user based on the retrieved data, wherein the preferred device is one of a plurality of devices associated with the user. Thereafter, the service center ascertains whether the preferred device of the user requires a new mode of delivery, and routes the communication to the preferred device of the user based on the ascertaining.

90 Claims, 10 Drawing Sheets

Related U.S. Application Data

(60) Provisional application No. 60/272,122, filed on Feb. 27, 2001, provisional application No. 60/436,018, filed on Dec. 26, 2002, provisional application No. 60/428,704, filed on Nov. 25, 2002, provisional application No. 60/276,505, filed on Mar. 19, 2001, provisional application No. 60/275,031, filed on Mar. 13, 2001, provisional application No. 60/275,020, filed on Mar. 13, 2001, provisional application No. 60/275,719, filed on Mar. 13, 2001, provisional application No. 60/275,667, filed on Mar. 13, 2001, provisional application No. 60/272,167, filed on Feb. 27, 2001.

(56) References Cited

U.S. PATENT DOCUMENTS

| | | |
|---|---|---|
| 4,600,814 A | 7/1986 | Cunniff et al. |
| 4,734,931 A | 3/1988 | Bourg et al. |
| 4,924,496 A | 5/1990 | Figa et al. |
| 5,014,303 A | 5/1991 | Velius |
| 5,113,431 A | 5/1992 | Horn |
| 5,168,515 A | 12/1992 | Gechter et al. |
| 5,222,125 A | 6/1993 | Creswell et al. |
| 5,274,700 A | 12/1993 | Gechter et al. |
| 5,327,486 A | 7/1994 | Wolff et al. ............... 379/93.23 |
| 5,329,578 A | 7/1994 | Brennan et al. |
| 5,428,663 A | 6/1995 | Grimes et al. |
| 5,440,624 A | 8/1995 | Schoof |
| 5,483,586 A | 1/1996 | Sussman |
| 5,533,096 A | 7/1996 | Bales |
| 5,535,265 A | 7/1996 | Suwandhaputra |
| 5,546,449 A | 8/1996 | Hogan et al. |
| 5,548,636 A | 8/1996 | Bannister et al. |
| 5,550,907 A | 8/1996 | Carlsen |
| 5,583,564 A | 12/1996 | Rao et al. |
| 5,586,173 A | 12/1996 | Misholi et al. |
| 5,588,037 A | 12/1996 | Fuller et al. |
| 5,608,788 A | 3/1997 | Demlow et al. |
| 5,619,555 A | 4/1997 | Fenton et al. |
| 5,621,787 A | 4/1997 | McKoy et al. |
| 5,623,541 A | 4/1997 | Boyle et al. |
| 5,631,904 A | 5/1997 | Fitser et al. ............... 370/261 |
| 5,638,434 A | 6/1997 | Gottlieb et al. |
| 5,649,105 A | 7/1997 | Aldred et al. |
| 5,652,789 A | 7/1997 | Miner et al. ............... 379/201 |
| 5,661,788 A | 8/1997 | Chin |
| 5,668,863 A | 9/1997 | Bieselin et al. |
| 5,673,080 A | 9/1997 | Biggs et al. |
| 5,692,213 A | 11/1997 | Goldberg et al. |
| 5,710,591 A | 1/1998 | Bruno et al. |
| 5,712,903 A | 1/1998 | Bartholomew et al. |
| 5,715,444 A | 2/1998 | Danish et al. |
| 5,717,863 A | 2/1998 | Adamson et al. |
| 5,719,925 A | 2/1998 | Peoples |
| 5,724,412 A | 3/1998 | Srinivasan |
| 5,742,095 A | 4/1998 | Bryant et al. |
| 5,742,668 A | 4/1998 | Pepe et al. |
| 5,742,905 A | 4/1998 | Pepe et al. |
| 5,745,561 A | 4/1998 | Baker et al. |
| 5,745,884 A | 4/1998 | Carnegie et al. |
| 5,751,800 A | 5/1998 | Ardon |
| 5,752,191 A | 5/1998 | Fuller et al. |
| 5,764,901 A | 6/1998 | Skarbo et al. |
| 5,805,670 A | 9/1998 | Pons et al. |
| 5,841,837 A | 11/1998 | Fuller et al. |
| 5,864,603 A | 1/1999 | Haavisto et al. |
| 5,872,841 A | 2/1999 | King et al. |
| 5,875,242 A | 2/1999 | Glaser et al. ............... 379/207 |
| 5,875,437 A | 2/1999 | Atkins |
| 5,892,900 A | 4/1999 | Ginter et al. |
| 5,903,845 A | 5/1999 | Buhrmann et al. ............... 455/461 |
| 5,907,324 A | 5/1999 | Larson et al. |
| 5,907,547 A | 5/1999 | Foladare et al. ............... 370/352 |
| 5,910,987 A | 6/1999 | Ginter et al. |
| 5,916,302 A | 6/1999 | Dunn et al. |
| 5,917,817 A | 6/1999 | Dunn et al. |
| 5,917,912 A | 6/1999 | Ginter et al. |
| 5,920,826 A | 7/1999 | Metso et al. |
| 5,920,847 A | 7/1999 | Kolling et al. |
| 5,926,535 A | 7/1999 | Reynolds |
| 5,944,769 A | 8/1999 | Musk et al. |
| 5,945,989 A | 8/1999 | Freishtat et al. |
| 5,960,342 A | 9/1999 | Liem et al. |
| 5,963,925 A | 10/1999 | Kolling et al. |
| 5,982,870 A | 11/1999 | Pershan et al. |
| 6,005,870 A | 12/1999 | Leung et al. |
| 6,011,579 A | 1/2000 | Newlin |
| 6,018,571 A | 1/2000 | Langlois et al. |
| 6,018,737 A | 1/2000 | Shah et al. |
| 6,021,428 A | 2/2000 | Miloslavsky |
| 6,029,151 A | 2/2000 | Nikander |
| 6,031,896 A | 2/2000 | Gardell et al. |
| 6,041,103 A | 3/2000 | La Porta et al. |
| 6,052,372 A | 4/2000 | Gittins et al. |
| 6,058,163 A | 5/2000 | Pattison et al. |
| 6,061,432 A | 5/2000 | Wallace et al. |
| 6,078,658 A | 6/2000 | Yunoki |
| 6,088,435 A | 7/2000 | Barber et al. |
| 6,092,102 A | 7/2000 | Wagner |
| 6,100,882 A | 8/2000 | Sharman et al. |
| 6,122,348 A | 9/2000 | French-St. George et al. |
| 6,134,318 A | 10/2000 | O'Neil |
| 6,134,548 A | 10/2000 | Gottsman et al. |
| 6,144,671 A | 11/2000 | Perinpanathan et al. |
| 6,145,096 A | 11/2000 | Bereiter et al. |
| 6,154,646 A | 11/2000 | Tran et al. |
| 6,161,008 A | 12/2000 | Lee et al. |
| 6,163,692 A | 12/2000 | Chakrabarti et al. |
| 6,167,119 A | 12/2000 | Bartholomew et al. |
| 6,188,756 B1 * | 2/2001 | Mashinsky ............... 379/207.04 |
| 6,189,026 B1 | 2/2001 | Birrell et al. |
| 6,192,123 B1 | 2/2001 | Grunsted et al. ............... 379/350 |
| 6,195,660 B1 | 2/2001 | Polnerow et al. |
| 6,215,863 B1 | 4/2001 | Bennett et al. |
| 6,219,413 B1 | 4/2001 | Burg ............... 379/215.01 |
| 6,226,374 B1 | 5/2001 | Howell et al. ............... 379/207 |
| 6,240,449 B1 | 5/2001 | Nadeau |
| 6,243,366 B1 | 6/2001 | Bradley et al. |
| 6,260,050 B1 | 7/2001 | Yost et al. |
| 6,275,575 B1 | 8/2001 | Wu |
| 6,282,522 B1 | 8/2001 | Davis et al. |
| 6,296,062 B1 | 10/2001 | Sundholm |
| 6,298,129 B1 | 10/2001 | Culver et al. |
| 6,301,338 B1 | 10/2001 | Makela et al. |
| 6,301,609 B1 | 10/2001 | Aravamudan et al. ............... 709/207 |
| 6,310,939 B1 | 10/2001 | Varney |
| 6,310,947 B1 | 10/2001 | Polcyn ............... 379/211.01 |
| 6,324,269 B1 | 11/2001 | Malik |
| 6,330,321 B2 | 12/2001 | Detampel et al. |
| 6,333,973 B1 | 12/2001 | Smith et al. |
| 6,349,299 B1 | 2/2002 | Spencer et al. |
| 6,351,279 B1 | 2/2002 | Sawyer |
| 6,363,143 B1 | 3/2002 | Fox |
| 6,371,484 B1 | 4/2002 | Yuan |
| 6,373,817 B1 | 4/2002 | Kung et al. |
| 6,373,930 B1 | 4/2002 | McConnell et al. |
| 6,385,754 B1 | 5/2002 | Mizumoto et al. |
| 6,389,113 B1 | 5/2002 | Silverman |
| 6,404,873 B1 | 6/2002 | Beyda et al. |
| 6,408,191 B1 | 6/2002 | Blanchard et al. |
| 6,408,327 B1 | 6/2002 | McClennon et al. |
| 6,411,605 B1 | 6/2002 | Vance et al. |
| 6,418,214 B1 | 7/2002 | Smythe et al. |
| 6,430,176 B1 | 8/2002 | Christie |
| 6,430,289 B1 | 8/2002 | Liffick ............... 379/900 |
| 6,434,226 B1 | 8/2002 | Takahashi |
| 6,442,245 B1 | 8/2002 | Castagna et al. |
| 6,442,251 B1 | 8/2002 | Maes et al. |
| 6,442,748 B1 | 8/2002 | Bowman-Amuah |
| 6,453,031 B2 | 9/2002 | Malik |
| 6,453,167 B1 | 9/2002 | Michaels et al. |
| 6,459,780 B1 | 10/2002 | Wurster et al. ............... 379/142.02 |

(56) References Cited

U.S. PATENT DOCUMENTS

| | | |
|---|---|---|
| 6,459,913 B2 | 10/2002 | Cloutier |
| 6,463,145 B1 | 10/2002 | O'Neal et al. ............ 379/211.02 |
| 6,463,464 B1 | 10/2002 | Lazaridis et al. |
| 6,466,910 B1 | 10/2002 | Desmond et al. |
| 6,470,079 B1 | 10/2002 | Benson |
| 6,473,615 B1 | 10/2002 | Theppasandra et al. |
| 6,477,374 B1 | 11/2002 | Shaffer et al. ................ 455/445 |
| 6,480,830 B1 | 11/2002 | Ford et al. |
| 6,480,890 B1 | 11/2002 | Lee, Jr. et al. |
| 6,507,644 B1 | 1/2003 | Henderson et al. |
| 6,519,326 B1 | 2/2003 | Milewski et al. |
| 6,522,734 B1 | 2/2003 | Allen et al. |
| 6,526,134 B1 | 2/2003 | Wallenius |
| 6,532,285 B1 | 3/2003 | Tucker et al. |
| 6,535,596 B1 | 3/2003 | Frey et al. |
| 6,539,082 B1 | 3/2003 | Lowe et al. |
| 6,542,596 B1 | 4/2003 | Hill et al. |
| 6,546,005 B1 * | 4/2003 | Berkley et al. ................ 370/353 |
| 6,546,262 B1 | 4/2003 | Freadman |
| 6,547,830 B1 | 4/2003 | Mercer |
| 6,560,329 B1 | 5/2003 | Vicars et al. |
| 6,563,914 B2 | 5/2003 | Sammon et al. |
| 6,564,261 B1 * | 5/2003 | Gudjonsson et al. ......... 709/227 |
| 6,574,324 B1 | 6/2003 | Malik |
| 6,574,470 B1 | 6/2003 | Chow et al. |
| 6,577,622 B1 | 6/2003 | Schuster et al. .............. 370/352 |
| 6,577,720 B1 | 6/2003 | Sutter |
| 6,584,122 B1 | 6/2003 | Matthews et al. ............. 370/493 |
| 6,587,890 B1 | 7/2003 | Kult et al. |
| 6,590,603 B2 | 7/2003 | Sheldon et al. |
| 6,590,969 B1 | 7/2003 | Peters et al. |
| 6,593,352 B2 | 7/2003 | Weichert et al. |
| 6,594,470 B1 | 7/2003 | Barnes et al. |
| 6,600,736 B1 | 7/2003 | Ball et al. |
| 6,609,113 B1 | 8/2003 | O'Leary et al. |
| 6,611,590 B1 | 8/2003 | Lu et al. |
| 6,614,786 B1 | 9/2003 | Byers ........................... 370/353 |
| 6,618,710 B1 | 9/2003 | Zondervan et al. |
| 6,625,258 B1 | 9/2003 | Ram et al. |
| 6,628,194 B1 | 9/2003 | Hellebust et al. |
| 6,628,770 B1 | 9/2003 | Jain et al. |
| 6,631,186 B1 | 10/2003 | Adams et al. |
| 6,636,587 B1 | 10/2003 | Nagai et al. |
| 6,643,356 B1 | 11/2003 | Hickey et al. |
| 6,654,768 B2 | 11/2003 | Celik |
| 6,661,340 B1 | 12/2003 | Saylor et al. |
| 6,665,388 B2 | 12/2003 | Bedingfield |
| 6,668,046 B1 | 12/2003 | Albal |
| 6,668,049 B1 | 12/2003 | Koch et al. |
| 6,681,119 B1 | 1/2004 | Verdonk |
| 6,683,939 B1 | 1/2004 | Chiloyan et al. |
| 6,687,362 B1 | 2/2004 | Lindquist et al. |
| 6,690,672 B1 | 2/2004 | Klein |
| 6,693,897 B1 | 2/2004 | Huang |
| 6,694,351 B1 | 2/2004 | Shaffer et al. |
| 6,697,461 B1 | 2/2004 | Middleswarth et al. |
| 6,697,796 B2 | 2/2004 | Kermani |
| 6,704,294 B1 | 3/2004 | Cruickshank |
| 6,711,158 B1 * | 3/2004 | Kahane et al. ................ 370/352 |
| 6,717,938 B1 | 4/2004 | D'Angelo |
| 6,718,026 B1 | 4/2004 | Pershan et al. |
| 6,718,178 B1 | 4/2004 | Sladek et al. |
| 6,724,887 B1 | 4/2004 | Eilbacher et al. |
| 6,731,238 B2 | 5/2004 | Johnson |
| 6,735,292 B1 | 5/2004 | Johnson |
| 6,738,458 B1 | 5/2004 | Cline et al. |
| 6,744,861 B1 | 6/2004 | Pershan et al. |
| 6,747,970 B1 | 6/2004 | Lamb et al. |
| 6,748,054 B1 | 6/2004 | Gross et al. |
| 6,754,227 B1 | 6/2004 | Petersen et al. |
| 6,757,365 B1 | 6/2004 | Bogard |
| 6,768,788 B1 | 7/2004 | Langseth et al. |
| 6,768,790 B1 | 7/2004 | Manduley et al. |
| 6,771,949 B1 | 8/2004 | Corliss |
| 6,772,436 B1 | 8/2004 | Doganata et al. |
| 6,775,267 B1 | 8/2004 | Kung et al. |
| 6,775,546 B1 | 8/2004 | Fuller |
| 6,788,772 B2 | 9/2004 | Barak et al. |
| 6,788,775 B1 | 9/2004 | Simpson |
| 6,792,092 B1 | 9/2004 | Michalewicz |
| 6,798,753 B1 | 9/2004 | Doganata et al. |
| 6,801,610 B1 | 10/2004 | Malik |
| 6,807,258 B1 | 10/2004 | Malik |
| 6,807,259 B1 | 10/2004 | Patel et al. |
| 6,816,468 B1 | 11/2004 | Cruickshank |
| 6,816,469 B1 | 11/2004 | Kung et al. |
| 6,820,055 B2 | 11/2004 | Saindon et al. |
| 6,839,417 B2 | 1/2005 | Weisman et al. |
| 6,842,460 B1 | 1/2005 | Olkkonen et al. |
| 6,847,823 B2 | 1/2005 | Lehikoinen et al. |
| 6,853,634 B1 * | 2/2005 | Davies et al. ................. 370/349 |
| 6,853,713 B1 | 2/2005 | Fobert et al. |
| 6,856,974 B1 | 2/2005 | Ganesan et al. |
| 6,870,916 B2 | 3/2005 | Henrikson et al. |
| 6,876,632 B1 | 4/2005 | Takeda |
| 6,876,736 B2 | 4/2005 | Lamy et al. |
| 6,882,714 B2 | 4/2005 | Mansfield |
| 6,882,838 B1 | 4/2005 | Lee et al. |
| 6,885,742 B1 | 4/2005 | Smith |
| 6,907,111 B1 | 6/2005 | Zhang et al. |
| 6,917,610 B1 | 7/2005 | Kung et al. |
| 6,937,713 B1 | 8/2005 | Kung et al. |
| 6,944,279 B2 | 9/2005 | Elsey et al. |
| 6,947,538 B2 | 9/2005 | Shen et al. |
| 6,954,521 B2 | 10/2005 | Bull et al. |
| 6,954,524 B2 | 10/2005 | Gibson |
| 6,956,942 B2 | 10/2005 | McKinzie et al. |
| 6,958,984 B2 | 10/2005 | Kotzin |
| 6,961,409 B2 | 11/2005 | Kato |
| 6,963,857 B1 | 11/2005 | Johnson |
| 6,970,705 B2 | 11/2005 | Yoshimoto et al. |
| 6,988,132 B2 * | 1/2006 | Horvitz ......................... 709/220 |
| 6,996,227 B2 | 2/2006 | Albal et al. |
| 6,996,370 B2 | 2/2006 | DeLoye et al. |
| 6,999,563 B1 | 2/2006 | Thorpe et al. |
| 7,024,209 B1 | 4/2006 | Gress et al. |
| 7,027,435 B2 | 4/2006 | Bardehle |
| 7,031,437 B1 | 4/2006 | Parsons et al. |
| 7,043,521 B2 | 5/2006 | Eitel |
| 7,050,558 B1 | 5/2006 | Pershan et al. |
| 7,065,198 B2 | 6/2006 | Brown et al. |
| 7,068,768 B2 | 6/2006 | Barnes |
| 7,069,298 B2 | 6/2006 | Zhu et al. |
| 7,076,528 B2 | 7/2006 | Premutico |
| 7,099,288 B1 | 8/2006 | Parker et al. |
| 7,102,643 B2 | 9/2006 | Moore et al. |
| 7,107,312 B2 | 9/2006 | Hackbarth et al. |
| 7,116,972 B1 | 10/2006 | Zhang et al. |
| 7,127,050 B2 | 10/2006 | Walsh et al. |
| 7,130,390 B2 | 10/2006 | Abburi |
| 7,139,728 B2 | 11/2006 | Rigole |
| 7,139,782 B2 | 11/2006 | Osaki |
| 7,142,646 B2 | 11/2006 | Zafar et al. |
| 7,149,773 B2 | 12/2006 | Haller et al. |
| 7,155,001 B2 | 12/2006 | Tiliks et al. |
| 7,167,552 B1 | 1/2007 | Shaffer et al. |
| 7,174,306 B1 | 2/2007 | Haseltine |
| 7,181,417 B1 | 2/2007 | Langseth et al. |
| 7,187,932 B1 | 3/2007 | Barchi |
| 7,190,773 B1 | 3/2007 | D'Silva et al. |
| 7,209,955 B1 | 4/2007 | Major et al. |
| 7,212,808 B2 | 5/2007 | Engstrom et al. |
| 7,245,929 B2 | 7/2007 | Henderson et al. |
| 7,254,220 B1 | 8/2007 | Reding et al. |
| 7,254,643 B1 | 8/2007 | Peters et al. |
| 7,283,808 B2 | 10/2007 | Castell et al. |
| 7,289,489 B1 | 10/2007 | Kung et al. |
| 7,308,087 B2 | 12/2007 | Joyce et al. |
| 7,315,614 B2 | 1/2008 | Bedingfield et al. |
| 7,353,258 B2 | 4/2008 | Washburn |
| 7,379,538 B1 | 5/2008 | Ali et al. |
| 7,418,090 B2 | 8/2008 | Reding et al. |
| 7,420,935 B2 | 9/2008 | Virolainen |
| 7,428,580 B2 | 9/2008 | Hullfish et al. |

(56) References Cited

U.S. PATENT DOCUMENTS

| | | |
|---|---|---|
| 7,546,337 B1 | 6/2009 | Crawford |
| 7,561,872 B1 | 7/2009 | Koch et al. |
| 7,606,909 B1 | 10/2009 | Ely et al. |
| 7,616,747 B2 | 11/2009 | Wurster et al. |
| 7,912,193 B2 | 3/2011 | Chingon et al. |
| 8,166,173 B2 | 4/2012 | Low et al. |
| 8,238,380 B2 | 8/2012 | D'Angelo |
| 8,271,591 B2 | 9/2012 | Malik et al. |
| 8,467,502 B2 | 6/2013 | Sureka et al. |
| 2001/0003202 A1 | 6/2001 | Mache et al. |
| 2001/0012286 A1 | 8/2001 | Huna et al. |
| 2001/0014863 A1 | 8/2001 | Williams, III |
| 2001/0017777 A1 | 8/2001 | Maruyama et al. |
| 2001/0025262 A1 | 9/2001 | Ahmed |
| 2001/0025280 A1 | 9/2001 | Mandato et al. |
| 2001/0032181 A1 | 10/2001 | Jakstadt et al. |
| 2001/0039191 A1 | 11/2001 | Maierhofer |
| 2001/0040954 A1 | 11/2001 | Brachman et al. |
| 2001/0043689 A1 | 11/2001 | Malik |
| 2001/0043690 A1 | 11/2001 | Bakshi et al. |
| 2001/0043691 A1 | 11/2001 | Bull et al. |
| 2001/0051534 A1 | 12/2001 | Amin |
| 2001/0051919 A1 | 12/2001 | Mason |
| 2001/0054066 A1 | 12/2001 | Spitzer |
| 2001/0056466 A1 | 12/2001 | Thompson et al. |
| 2002/0012425 A1 | 1/2002 | Brisebois et al. |
| 2002/0018550 A1 | 2/2002 | Hafez |
| 2002/0022453 A1 | 2/2002 | Balog et al. |
| 2002/0026575 A1 | 2/2002 | Wheeler et al. |
| 2002/0035617 A1 | 3/2002 | Lynch et al. |
| 2002/0040355 A1 | 4/2002 | Weiner |
| 2002/0046299 A1 | 4/2002 | Lefeber et al. |
| 2002/0055351 A1 | 5/2002 | Elsey et al. |
| 2002/0057678 A1 | 5/2002 | Jiang et al. |
| 2002/0062251 A1 | 5/2002 | Anandan et al. |
| 2002/0064268 A1 | 5/2002 | Pelletier |
| 2002/0069060 A1 | 6/2002 | Cannavo et al. |
| 2002/0069096 A1 | 6/2002 | Lindoerfer et al. |
| 2002/0071539 A1 | 6/2002 | Diament et al. |
| 2002/0073163 A1 | 6/2002 | Churchill et al. |
| 2002/0075303 A1 | 6/2002 | Thompson et al. |
| 2002/0075306 A1 | 6/2002 | Thompson et al. |
| 2002/0076022 A1 | 6/2002 | Bedingfield |
| 2002/0076025 A1* | 6/2002 | Liversidge et al. ...... 379/202.01 |
| 2002/0076026 A1 | 6/2002 | Batten |
| 2002/0076027 A1 | 6/2002 | Bernnan et al. |
| 2002/0077082 A1 | 6/2002 | Cruickshank |
| 2002/0078153 A1 | 6/2002 | Chung et al. |
| 2002/0080942 A1 | 6/2002 | Clapper ................ 379/201.01 |
| 2002/0082028 A1* | 6/2002 | Wittenkamp ................ 455/458 |
| 2002/0082030 A1 | 6/2002 | Berndt et al. |
| 2002/0082997 A1 | 6/2002 | Kobata et al. |
| 2002/0083462 A1 | 6/2002 | Arnott ................ 348/14.08 |
| 2002/0085515 A1 | 7/2002 | Jaynes et al. |
| 2002/0085687 A1 | 7/2002 | Contractor et al. |
| 2002/0085701 A1* | 7/2002 | Parsons et al. ........... 379/211.01 |
| 2002/0087469 A1 | 7/2002 | Ganesan et al. |
| 2002/0100798 A1 | 8/2002 | Farrugia et al. |
| 2002/0103864 A1 | 8/2002 | Rodman et al. |
| 2002/0103898 A1 | 8/2002 | Moyer et al. |
| 2002/0110121 A1 | 8/2002 | Mishra ................ 370/389 |
| 2002/0115471 A1 | 8/2002 | DeLoye et al. |
| 2002/0122545 A1* | 9/2002 | Schwab et al. .......... 379/211.02 |
| 2002/0126817 A1 | 9/2002 | Hariri et al. |
| 2002/0128025 A1 | 9/2002 | Sin |
| 2002/0128033 A1 | 9/2002 | Burgess |
| 2002/0137507 A1 | 9/2002 | Winkler |
| 2002/0137530 A1 | 9/2002 | Karve |
| 2002/0138468 A1 | 9/2002 | Kermani |
| 2002/0146105 A1 | 10/2002 | McIntyre |
| 2002/0147777 A1 | 10/2002 | Hackbarth et al. |
| 2002/0147811 A1 | 10/2002 | Schwartz et al. ............. 709/225 |
| 2002/0152165 A1 | 10/2002 | Dutta et al. |
| 2002/0154210 A1 | 10/2002 | Ludwig et al. |
| 2002/0168055 A1 | 11/2002 | Crockett et al. |
| 2002/0177410 A1 | 11/2002 | Klein et al. |
| 2002/0178117 A1 | 11/2002 | Maguire et al. |
| 2003/0005150 A1 | 1/2003 | Thompson et al. |
| 2003/0014488 A1 | 1/2003 | Dalal et al. |
| 2003/0035381 A1 | 2/2003 | Chen et al. |
| 2003/0036380 A1 | 2/2003 | Skidmore |
| 2003/0045309 A1 | 3/2003 | Knotts |
| 2003/0046071 A1 | 3/2003 | Wyman |
| 2003/0053612 A1 | 3/2003 | Henrikson et al. |
| 2003/0055735 A1 | 3/2003 | Cameron et al. |
| 2003/0055906 A1 | 3/2003 | Packham et al. |
| 2003/0058838 A1 | 3/2003 | Wengrovitz ................ 370/352 |
| 2003/0063732 A1 | 4/2003 | Mcknight et al. |
| 2003/0069874 A1 | 4/2003 | Hertzog et al. |
| 2003/0083040 A1 | 5/2003 | Ruth et al. |
| 2003/0092451 A1 | 5/2003 | Holloway et al. |
| 2003/0093700 A1 | 5/2003 | Yoshimoto et al. |
| 2003/0096626 A1 | 5/2003 | Sabo et al. |
| 2003/0097635 A1 | 5/2003 | Giannetti |
| 2003/0104827 A1 | 6/2003 | Moran et al. |
| 2003/0108172 A1 | 6/2003 | Petty et al. |
| 2003/0112928 A1 | 6/2003 | Brown et al. |
| 2003/0112952 A1* | 6/2003 | Brown et al. ............ 379/211.01 |
| 2003/0119532 A1 | 6/2003 | Hatch |
| 2003/0140004 A1 | 7/2003 | O'Leary et al. |
| 2003/0142798 A1 | 7/2003 | Gavette et al. |
| 2003/0147518 A1 | 8/2003 | Albal et al. |
| 2003/0149662 A1 | 8/2003 | Shore |
| 2003/0158860 A1 | 8/2003 | Caughey |
| 2003/0165223 A1 | 9/2003 | Timmins et al. |
| 2003/0167229 A1 | 9/2003 | Ludwig et al. |
| 2003/0169330 A1 | 9/2003 | Ben-Shachar et al. |
| 2003/0179743 A1 | 9/2003 | Bosik et al. |
| 2003/0179864 A1 | 9/2003 | Stillman et al. |
| 2003/0187992 A1 | 10/2003 | Steenfeldt et al. |
| 2003/0208541 A1 | 11/2003 | Musa |
| 2003/0217097 A1 | 11/2003 | Eitel |
| 2003/0228863 A1 | 12/2003 | Vander Veen et al. |
| 2004/0002350 A1 | 1/2004 | Gopinath et al. |
| 2004/0002902 A1 | 1/2004 | Muehlhaeuser |
| 2004/0019638 A1 | 1/2004 | Makagon et al. ............. 709/204 |
| 2004/0034700 A1 | 2/2004 | Polcyn |
| 2004/0037409 A1 | 2/2004 | Crockett et al. |
| 2004/0044658 A1 | 3/2004 | Crabtree et al. |
| 2004/0052356 A1 | 3/2004 | McKinzie et al. |
| 2004/0081292 A1 | 4/2004 | Brown et al. |
| 2004/0103152 A1 | 5/2004 | Ludwig et al. |
| 2004/0119814 A1 | 6/2004 | Clisham et al. |
| 2004/0127256 A1 | 7/2004 | Goldthwaite et al. |
| 2004/0156491 A1 | 8/2004 | Reding et al. |
| 2004/0184593 A1 | 9/2004 | Elsey et al. |
| 2004/0203942 A1 | 10/2004 | Dehlin |
| 2004/0208305 A1 | 10/2004 | Gross et al. |
| 2004/0236792 A1 | 11/2004 | Celik |
| 2004/0247088 A1 | 12/2004 | Lee |
| 2004/0249884 A1 | 12/2004 | Caspi et al. |
| 2004/0264654 A1 | 12/2004 | Reding et al. |
| 2005/0053206 A1 | 3/2005 | Chingon et al. |
| 2005/0053221 A1 | 3/2005 | Reding et al. |
| 2005/0102382 A1 | 5/2005 | MacGregor et al. |
| 2005/0117714 A1 | 6/2005 | Chingon et al. |
| 2005/0129208 A1 | 6/2005 | McGrath et al. |
| 2005/0149487 A1 | 7/2005 | Celik |
| 2005/0191994 A1 | 9/2005 | May et al. |
| 2005/0216421 A1 | 9/2005 | Barry et al. |
| 2005/0220286 A1 | 10/2005 | Valdez et al. |
| 2005/0243993 A1 | 11/2005 | McKinzie et al. |
| 2006/0093120 A1 | 5/2006 | Thorpe et al. |
| 2006/0095575 A1 | 5/2006 | Sureka et al. |
| 2006/0128409 A1 | 6/2006 | Gress et al. |
| 2006/0168140 A1 | 7/2006 | Inoue et al. |
| 2006/0276179 A1 | 12/2006 | Ghaffari et al. |
| 2006/0277213 A1 | 12/2006 | Robertson et al. |

(56) References Cited

U.S. PATENT DOCUMENTS

| | | | |
|---|---|---|---|
| 2007/0021111 A1 | 1/2007 | Celik | |
| 2009/0060155 A1 | 3/2009 | Chingon et al. | |

FOREIGN PATENT DOCUMENTS

| | | |
|---|---|---|
| EP | 0818908 | 1/1998 |
| EP | 0818908 A3 | 1/1998 |
| EP | 1014630 | 6/2000 |
| EP | 1017210 | 7/2000 |
| EP | 1028578 | 8/2000 |
| EP | 1161063 | 12/2001 |
| EP | 1193617 | 3/2002 |
| EP | 1235387 | 8/2002 |
| EP | 1294201 | 3/2003 |
| JP | 59-169264 | 9/1984 |
| JP | 02-260750 | 10/1990 |
| JP | 4-336742 | 11/1992 |
| JP | 05-316233 | 11/1993 |
| JP | 06-113020 | 4/1994 |
| JP | 07-030664 | 1/1995 |
| JP | 07-58856 | 3/1995 |
| JP | 07-107171 | 4/1995 |
| JP | 7-107549 | 4/1995 |
| JP | 07-107549 | 4/1995 |
| JP | 07-123098 | 5/1995 |
| JP | 08-149226 | 6/1996 |
| JP | 08-181763 | 7/1996 |
| JP | 08-298546 | 11/1996 |
| JP | 08-331642 | 12/1996 |
| JP | 09-064869 | 3/1997 |
| JP | 09-64977 | 3/1997 |
| JP | 09-083651 | 3/1997 |
| JP | 9-200350 | 7/1997 |
| JP | 9-223087 | 8/1997 |
| JP | 09-261759 | 10/1997 |
| JP | 09-294158 | 11/1997 |
| JP | 09-294163 | 11/1997 |
| JP | 10-013546 | 1/1998 |
| JP | 10-051555 | 2/1998 |
| JP | 10-155038 | 6/1998 |
| JP | 10-173769 | 6/1998 |
| JP | 10-336319 | 12/1998 |
| JP | 11-55407 | 2/1999 |
| JP | 11-127222 | 5/1999 |
| JP | 11-136316 | 5/1999 |
| JP | 11-187156 | 7/1999 |
| JP | 11-191800 | 7/1999 |
| JP | 11-266309 | 9/1999 |
| JP | 2000-032116 | 1/2000 |
| JP | 2000-134309 | 5/2000 |
| JP | 2000-165433 | 6/2000 |
| JP | 2000-196756 | 7/2000 |
| JP | 2000-224301 | 8/2000 |
| JP | 2000-270307 | 9/2000 |
| JP | WO-00/60837 | 10/2000 |
| JP | 2001-144859 | 5/2001 |
| JP | 2001-156921 | 6/2001 |
| JP | 2001-197210 | 7/2001 |
| JP | 2001-197562 | 7/2001 |
| JP | 2001-243231 | 9/2001 |
| JP | 2001-298545 | 10/2001 |
| JP | 2002-16673 | 1/2002 |
| JP | 2002-41522 | 2/2002 |
| JP | 2002-044123 | 2/2002 |
| JP | 2002-44257 | 2/2002 |
| JP | 2002-057807 | 2/2002 |
| JP | 2002-094696 | 3/2002 |
| JP | 2002-232575 | 8/2002 |
| JP | 2002-237893 | 8/2002 |
| JP | 2002-247148 | 8/2002 |
| JP | 2002-261834 | 9/2002 |
| JP | 2002-300290 | 10/2002 |
| JP | 2002-300306 | 10/2002 |
| WO | 95/01248 | 5/1995 |
| WO | WO 96/14704 | 5/1996 |
| WO | WO-97/20423 | 6/1997 |
| WO | WO-97/33421 | 9/1997 |
| WO | WO-98/02007 | 1/1998 |
| WO | WO-99/22493 | 5/1999 |
| WO | 99/38309 | 7/1999 |
| WO | WO 00/45557 | 8/2000 |
| WO | WO-00/64133 | 10/2000 |
| WO | 2000-349902 | 12/2000 |
| WO | WO01/11586 | 2/2001 |
| WO | WO 01/11586 A1 | 2/2001 |
| WO | WO-01/22751 | 3/2001 |
| WO | WO 01/35621 | 5/2001 |
| WO | WO-01/52513 | 7/2001 |
| WO | WO 01/89212 | 11/2001 |
| WO | WO-02/25907 | 3/2002 |
| WO | WO-02/43338 | 5/2002 |

OTHER PUBLICATIONS

"FAQ Premium Home Answer" eVoice, http://content.evoice.com/wcs/sicinUp/FAQ_premHA_s01.htm.
"Voice-ASP, White Paper Technology & Processes," eVoice, Dec. 13, 2000.
"Voice-ASP, White Paper: Market Opportunities for Enhanced Voicemail," eVoice, Nov. 10, 2000.
"Audio Digitizing Process," TalkBank, http://www.talkbank.org/da/audiodig.html.
"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.
"Macromedia SoundEdit 16 Support Center—Working with Other Programs, What is Shockwave Audio Streaming?" http://www.macromedia.com/support/soundedit/how/shock/whatis.html.
"Chapter 3: Overview," last updated Dec. 2, 1999, http://service.real.com/help/librarvicluides/g270/htmfiles/overview.htm.
"How Internet Radio Works," Howstuffworks, http://computer.howstuffworks.com/internet-radio.htm/printable.
"Telecommunications and Personal Management Services Linked in Collaboration by Verizon and Microsoft," Oct. 23, 2001, http://www.microsoft.com/presspass/press/2001/oct01/10-23MSVerizonPr.asp.
"Real-Time Collaboration Integration in the Portal," T. Odenwald, SAP Design Guild, http://www.sapdesignguild.org/editions/edition5/synch_collab.asp.
"NetMeeting101," http://www.meetingbywire.com/NetMeeting101.htm.
"NetMeeting102," http://www.meetinqbvwire.com/NetMeeting102.htm.
"Instructions on Application Sharing and Data Collaboration," VCON Escort and Cruiser, http://www.vide.gatech.edu/docs/share/.
"Instructions on Multipoint Application Sharing and Data Collaboration," VCON Escort and Cruiser with the RadVision MCU, http://www.vide.gatech.edu/docs/multi-share/.
"File Transfer," Microsoft Windows Technologies Windows NetMeeting, last updated Jun. 4, 1999, http://www.microsoft.com/windows/netmeeting/features/files/default.asp.
"From Dial Tone to Media Tone," Analyst: R. Mahowald, IDC, Jun. 2002.
"MediaTone—The 'Dial Tone' for Web Communications Services," Webex, 2003.
Business Solutions/Professional, http://www.accessline.com/business_sol/bs_professional_body.html.
"Accessline Comms' Accessline Service, The One-Number Wonder," *CommWeb*, T. Kramer, Feb. 1, 2000, http://www.cconvergence.com/article/TCM20000504500 14.
"InteleScreener," 2003, http://www.intelescreener.com/howitworks.html.
"TeleZapper from Privacy Technologies," Privacy Corps—Our Review, 2002, http://www.privacycorps.com/pages/product1.htm.
"A Proposal for Internet Call Waiting Service Using SIP," A. Brusilovsky et al., Lucent Technologies, PINT Working Group, Internet Draft, Jan. 1999.

(56) References Cited

OTHER PUBLICATIONS

"A Model for Presence and Instant Messaging," M. Day et al., Fujitsu, Feb. 2000, Network Working Group, Request for Comments 2778.

Data Connection, Strategic Computer Technology, MeetingServer, "Broadband for Learning Case Study," Data Connection Ltd, 1998-2004, http://www.dataconnection.com/conferencing/meetingserver_casestudy.htm.

Data Connection, MailNGen, "Next Generation Messaging for Service Providers," Data Connection Limited, Apr. 2003.

Data Connection, Strategic Computer Technology, "Directories Explained," Data Connection Ltd, 1998-2004, http://www.dataconnection.com/inetapps/direxpl.htm.

Data Connection, Strategic Computer Technology, Directory Systems, "Directories and Meta-Directories," Data Connection Ltd, 1998-2004, http://www.dataconnection.com/inetapps/directory.htm.

Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm.

Data Connection, Strategic Software Technology, "DC-SurroundSuite for Service Providers," Data Connection Ltd, 1998-2000, http://web.archive.org/web/20000914200355/www.dataconnection.com/messging/spssuite.htm.

Data Connection, Strategic Computer Technology, "Messaging Software Products and Services," Data Connection Ltd, 1998-2000, http://web.archive.org/web/20000819063320/www.dataconnection.com/messaing/messgidx.htm.

Data Connection, Strategic Software Technology, "DC-Share for UNIX," Data Connection Ltd, 1998-2000, http://web.archive.org/web/20000914200713/www.dataconnection.com/conf/DCshare.htm.

Data Connection, Strategic Software Technology, "DC-H.323," Data Connection Ltd, 1998-2000, http://web.archive.org/web/20001120050600/www.dataconnection.com/conf/h323.htm.

Data Connection, Strategic Software Technology, "DC-WebShare," Data Connection Ltd, 1998-2000, http://web.archive.org/web/20001016115016/www.dataconnection.com/conf/webshare.htm.

Data Connection, Strategic Computer Technology, "DC-Recorder," Data Connection Ltd, 1998-2000, http://web.archive.org/web/20001016055611/www.dataconnection.com/conf/recorder.htm.

Data Connection, Strategic Software Technology, "DC-MeetingServer," Data Connection Ltd, 1998-2000, http://web.archive.org/web/20000914200719/www.dataconnection.com/conf/meetingserver.htm.

Data Connection, Strategic Computer Technology, "DC-MeetingServer," Data Connection Ltd, 1998-2000, http://web.archive.org/web/20021201144529/www.dataconnection.com/inetapps/conferencing.htm.

Data Connection, Strategic Software Technology, "DC-VoiceNet Features," Data Connection Ltd, 1998-2000, http://web.archive.org/web/20001016102614/www.dataconnection.com/messging/vnfeat.htm.

Data Connection, Strategic Software Technology, "DC-VoiceNet," Data Connection Ltd, 1998-2000, http://web.archive.org/web/20000914200424/www.dataconnection.com/messging/vnet.htm.

Data Connection, Strategic Computer Technology, "Messaging Software Products and Services," Data Connection Ltd, 1998-2000, http://web.archive.org/web/20010305143803/www.dataconnection.com/messging/messgidx.htm.

Data Connection, Strategic Computer Technology, "DC-SurroundSuite for Enterprises," Data Connection Ltd, 1998-2000, http://web.archive.org/web/20010306082711/www.dataconnection.com/messging/enssuite.htm.

Data Connection, "SmartDialer Functional Overview," Version v1.0, Internet Applications Group, Data Connection Ltd., Nov. 3, 2003.

Data Connection, "SIP Market Overview, An analysis of SIP technology and the state of the SIP Market," Jonathan Cumming, Data Connection Ltd., 2003-2004.

Data Connection, "Integrating Voicemail Systems, A white paper describing the integration of heterogeneous voicemail systems," Michael James, Internet Applications Group, Data Connection Ltd., 2004.

Data Connection, Strategic Computer Technology, "MailNGen: Next generation messaging for Service Providers," Data Connection Ltd, 1998-2004, http://www.dataconnection.com/messaging/.

Data Connection, Strategic Computer Technology, "MailNGen: Unified Messaging," Data Connection Ltd, 1998-2004, http://www.dataconnection.com/messaging/unified_messaging.htm.

Data Connection, Strategic Computer Technology, "MeetingServer: The award-winning web conferencing solution for Service Providers," Data Connection Ltd, 1998-2005, http://www.dataconnection.com/conferencing/.

Data Connection, Strategic Computer Technology, "MeetingServer: The web conferencing solution for Service Providers," Data Connection Ltd, 1998-2004, http://www.dataconnection.com/conferencing/meetingserver.htm.

Data Connection, Strategic Computer Technology, "MeetingServer: Web conferencing architecture," Data Connection Ltd, 1998-2004, http://www.dataconnection.com/conferencing/meetingserver_arch.htm.

"The Mobile Phone User Glide"; http://www.mobileshop.org/usertech/wildfire.htm, printed Oct. 1, 2004.

Kornowski, J., "Wildfire at Your Back and Call—A Voice-Activated Telephone Assistant That Minds You and Your Messages", http://www.lacba.org/lalawyer/techwildfire.html, pronted Oct. 1, 2004.

Cisco Personal Assistant 1.4, Cisco Systems, Jun. 24, 2003, http://www.cisco.com/en/US/products/sw/voicesw/ps2026/prod_presentation_list.html, printed Oct. 1, 2004.

"MP3 Recorder Download—MP3 Recorder—Record Audio Stream to MP3 or WAV," 2002 http://www.mp3-recorder.net.

"FAQ Premium Home Answer" eVoice, http://content.evoice.com/wcs/signUp/FAQ_premHA_s01.htm.

"Macromedia SoundEdit 16 Support Center—Working with Other Programs, What is Shockwave Audio Streaming?" http://www.macromedia.com/supoort/soundedit/how/shock/whatis.html.

"Chapter 3: Overview," last updated Dec. 2, 1999, http://service.real.com/help/library/guides/g270/htmfiles/overview.htm.

U.S. Appl. No. 09/828,679, filed Apr. 6, 2001, Reding et al.

U.S. Appl. No. 09/785,223, filed Feb. 16, 2001, Swingle et al.

"NetMeeting102," http://www.meetingbywire.com/NetMeeting102.htm.

"Accessline Comms' Accessline Service, The One-Number Wonder," *CommWeb*, T. Kramer, Feb. 1, 2000, http://www.cconvergence.com/article/TCM20000504S0014.

"A Model for Presence and Instant Messaging", M. Day, et al. Fujitsu, Feb. 2000, Network Working Group, Request for Comments 2778.

"Calendar Scheduling Teleconference Communication Mechanism," IBM Technical Disclosure Bulletin, IBM Corp. New York, US, vol. 37, No. 3, Mar. 1, 1994, p. 561.

White, "How Computers Work," Millenium Edition, Sep. 1999, Que Corporation, pp. vi-xi, 135-184, 399-421.

Derfler et al., "How Networks Work," Bestseller Edition, 1996, Ziff-Davis Press, pp. vi-ix, 1-3, 21-70, 190-198.

Gralla, "How the Internet Works," Ziff-Davis Press, 1999, pp. vi-xi, 2-3, 8-11, 308-324.

Muller, "Desktop Encyclopedia of the Internet," Artech House Inc., 1999, pp. v-xiv, 233-246, 539-559.

"Audio Digitizing Process," TalkBank, http://www.talkbank.org/da/audiodig.html, six pages, retrieved from the.Internet on Oct. 15, 2003.

"Business Solutions/Professional," http://www.accessline,com/business_sol/bs_professional_body.html, two pages, retrieved from the internet on Apr. 17, 2003.

"Click to Cali," http://replay.waybackmachine.org/20020207142936/http://www.clicktocall.com/main.htm, Internet archive of website "www.clicktocall.com", dated Feb. 7, 2002.

Dec. 5, 2011 Canadian Office Action Issued in CA s/n 2,507,500,.

"eVoice FAQ—Premium Home Answer," http://content.evoice.com/wcs/signUp/FAQ_premHA_s01.htm, three pages, retrieved from the internet on Jul. 2, 2001.

(56) References Cited

OTHER PUBLICATIONS

"How Internet Radio Works," Howstuffworks, http://computer.howstuffworks.com/internet-radio.htm/printable, five pages, retrieved from the internet on Oct. 16, 2003.

"Instructions on Application Sharing and Data Collaboration," VCON Escort and Cruiser, http://www.vide.gatech.edu/docs/share/, 10 pages, retrieved from the internet on Oct. 6, 2003.

Instructions on Multipoint Application Sharing and Data Collaboration, VCON Escort and Cruiser with the RadVision MCU, http://www.vide.gatech.edu/docs/multi-share, six pages, retrieved from the Internet on Oct. 6, 2003.

"Macromedia SoundEdit 16 Support Center-Working with Other Programs, What is Shockwave Audio Streaming?" http://www.macromedia.com/support/soundedit/howi/shock/whatis.html, two pages, retrieved from the Internet on Oct. 24, 2003.

"NetMeeting101," Meeting by Wire, http://www.meetingbywire.com/NetMeeting101.htm, nine pages, retrieved from the internet on Oct. 6, 2003.

"NetMeeting102," Meeting by Wire, http://www.meetingbywire.com/NetMeeting102.htm, 11pages, retrieved from the internet on Oct. 6, 2003.

Chou, "Inside SSL: The Secure Sockets Layer Protocol," IT Professional, vol. 4, Issue 4, pp. 47-52, Jul./Aug. 2002.

Gaedke, et al., "Web Content Delivery to Heterogeneous Mobile Platforms", Advances in Database Technologies, Lecture Notes in Computer Science (LNCS), vol. 1552, pp. 205-217, Nov. 16-19, 1998.

Gessler et al., "PDAs as Mobile WWW Browsers", Computer Networks and ISDN Systems, vol. 28, Issue 1-2, 10 pages, Dec. 1995.

Kunz et al., "An Architecture for Adaptive Mobile Applications", 11th International Conference on Wireless Communications, pp. 1-12, May 13, 1999.

Lauff, et al., "Multimedia Client implementation on Personal Digital Assistants", Fourth Conference on Applied Natural Language Processing.(ANLP-94), pp. 1-13, Sep. 10-12, 1997.

Odenwald, "Real-Time Collaboration Integration in the Portal," SAP Design Guild, http://www.sapdesignguild.org/editions/edition5/synch_collab.asp, 10 pages, retrieved from the internet on Oct. 6, 2003.

Wagner, et al., "Analysis of the SSL 3.0 Protocol," Proceedings of the 2nd Conference on Proceedings of the Second USENIX Workshop on Electronic Commerce (WOEC'96 ) vol. 2, 12 pages, Nov. 1996.

\* cited by examiner

900

| Contact Name | State | Preferred Device |
|---|---|---|
| Jim<br>    Work<br>    Home<br>    Mobile | <br>Available<br>Available<br>Busy | <br><br><br>X |
| Steve<br>    Home<br>    Pager | <br>Do Not Disturb<br>Do Not Disturb | |
| Bob<br>    Work<br>    Home | <br>Unknown<br>Unknown | |

FIG. 9

METHODS AND SYSTEMS FOR AUTOMATIC FORWARDING OF COMMUNICATIONS TO A PREFERRED DEVICE

RELATED APPLICATIONS

This application is a continuation-in-part of U.S. patent application Ser. No. 10/083,793, entitled "METHOD AND APPARATUS FOR CALENDARED COMMUNICATIONS FLOW CONTROL," filed Feb. 27, 2002; U.S. patent application Ser. No. 10/083,792, entitled "VOICE MAIL INTEGRATION WITH INSTANT MESSENGER," filed Feb. 27, 2002 now U.S. Pat. No. 7,142,646; U.S. patent application Ser. No. 10/083,884, entitled "DEVICE INDEPENDENT CALLER ID," filed Feb. 27, 2002 now U.S. Pat. No. 7,190,773; and U.S. patent application Ser. No. 10/083,822, entitled "METHOD AND APPARATUS FOR A UNIFIED COMMUNICATION MANAGEMENT VIA INSTANT MESSAGING," filed Feb. 27, 2002, all of which claim priority to U.S. Provisional Patent Application Nos. 60/272,122 filed Feb. 27, 2001, 60/272,167 filed Feb. 27, 2001, 60/275,667 filed Mar. 13, 2001, 60/275,719 filed Mar. 13, 2001, 60/275,020 filed Mar. 13, 2001, 60/275,031 filed Mar. 13, 2001, and 60/276,505 filed Mar. 19, 2001, and all of which are expressly incorporated herein by reference in their entirety.

Applicants also claim the right to priority under 35 U.S.C. §119(e) based on Provisional Patent Application No. 60/428,704, entitled "DIGITAL COMPANION," filed Nov. 25, 2002; and Provisional Patent Application No. 60/436,018, entitled "DIGITAL COMPANION," filed Dec. 26, 2002, both of which are expressly incorporated herein by reference in their entirety.

The present application also relates to U.S. patent application Ser. No. 10/084,121, entitled "CALENDAR-BASED CALLING AGENTS," filed Feb. 27, 2002; U.S. patent application Ser. No. 10/720,661, entitled "METHODS AND SYSTEMS FOR DRAG AND DROP CONFERENCE CALLING," filed Nov. 24, 2003; U.S. patent application Ser. No. 10/720,859, entitled "METHODS AND SYSTEMS FOR CONFERENCE CALL BUFFERING," filed Nov. 24, 2003; U.S. patent application Ser. No. 10/721,009, entitled "METHODS AND SYSTEMS FOR COMPUTER ENHANCED CONFERENCE CALLING," filed Nov. 24, 2003; U.S. patent application Ser. No. 10/720,943, entitled "METHODS AND SYSTEMS FOR REMOTE CALL ESTABLISHMENT," filed Nov. 24, 2003; U.S. patent application Ser. No. 10/721,005, entitled "METHODS AND SYSTEMS FOR CALL MANAGEMENT WITH USER INTERVENTION," filed Nov. 24, 2003; U.S. patent application Ser. No. 10/720,868, entitled "METHODS AND SYSTEMS FOR DIRECTORY INFORMATION LOOKUP," filed Nov. 24, 2003; U.S. patent application Ser. No. 10/720,970, entitled "METHODS AND SYSTEMS FOR AUTOMATIC COMMUNICATION LINE MANAGEMENT BASED ON DEVICE LOCATION," filed Nov. 24, 2003; U.S. patent application Ser. No. 10/720,952, entitled "METHODS AND SYSTEMS FOR ADAPTIVE MESSAGE AND CALL NOTIFICATION," filed Nov. 24, 2003; U.S. patent application Ser. No. 10/720,870, entitled "METHODS AND SYSTEMS FOR A CALL LOG," filed Nov. 24, 2003; U.S. patent application Ser. No. 10/720,971, entitled "METHODS AND SYSTEMS FOR LINE MANAGEMENT," filed Nov. 24, 2003; U.S. patent application Ser. No. 10/720,784, entitled "METHODS AND SYSTEMS FOR CONTACT MANAGEMENT," filed Nov. 24, 2003; U.S. patent application Ser. No. 10/720,920, entitled "METHODS AND SYSTEMS FOR NOTIFICATION OF CALL TO PHONE DEVICE," filed Nov. 24, 2003; U.S. patent application Ser. No. 10/720,825, entitled "METHODS AND SYSTEMS FOR SINGLE NUMBER TEXT MESSAGING," filed Nov. 24, 2003; U.S. patent application Ser. No. 10/720,944, entitled "METHODS AND SYSTEMS FOR MULTI-USER SELECTIVE NOTIFICATION," filed Nov. 24, 2003; U.S. patent application Ser. No. 10/720,933, entitled "METHODS AND SYSTEMS FOR CPN TRIGGERED COLLABORATION," filed Nov. 24, 2003; and U.S. patent application Ser. No. 10/720,938, entitled "METHODS AND SYSTEMS FOR PREEMPTIVE REJECTION OF CALLS," filed Nov. 24, 2003, all of which are expressly incorporated herein by reference in their entirety.

TECHNICAL FIELD

The present invention relates generally to data processing systems and, more particularly, to a method and system for automatically forwarding communications to a preferred device.

BACKGROUND

A wide variety of means exist for communication between users. For example, a user may conduct phone calls via a home phone, work phone, and mobile phone. In addition, users may also communicate using devices such as PC's, PDA's, pagers, etc. using manners of communicating such as email and instant messaging.

Unfortunately, managing such a wide variety of communication means can be difficult. In particular, as a user changes location, communication with the user may vary. For example, while on travel, it may only be possible to reach a user by mobile phone. However, the user may best be reached by email while at work. Also, the user may wish to implement various rules for receiving and controlling communications. For example, to be reached at home, the user may want the home phone to ring three times before forwarding the call to a mobile phone. As another example, the user may wish to be paged each time an email is received from a particular person while away from the office.

Current call management systems make it possible to have calls forwarded to a particular device when a call is made to another device. Current call management systems, however, do not enable a mode of delivery to the particular device to change based on the requirements of the particular device. Current call management systems also do not enable a user to be informed of a state of a target user's line along with an identity of a device on which the target user wishes to be contacted.

SUMMARY OF THE INVENTION

Methods and systems consistent with the present invention route a communication to a preferred device. A service center is operable to receive information pertaining to a communication to a user from a calling party, and retrieve data corresponding to the user using the received information. The service center also determines a preferred device of the user based on the retrieved data. Thereafter, the service center ascertains whether the preferred device of the user requires a new mode of delivery, and routes the communication to the preferred device of the user based on the ascertaining.

Other methods and systems consistent with the principles of the invention also route a communication to a preferred device of a user. A service center is operable to receive information pertaining to a communication to a user from a calling party, and retrieve data corresponding to the user using the received information. The service center also determines a preferred device of the user based on the retrieved data. Thereafter, the service center routes the communication to the preferred device of the user.

Other methods and systems consistent with the principles of the invention also route a communication to a preferred device. A service center is operable to receive information pertaining to a communication to a user from a calling party, the communication to the user being initiated by an action of the calling party on a data network. The service center may also retrieve data corresponding to the user using the received information and determine a preferred device of the user based on the retrieved data. In addition, the service causes the initiation of a first call to a device of the calling party and the initiation of a second call to the preferred device of the user. Thereafter, the service center ascertains whether the preferred device of the user requires a new mode of delivery and connects the first call and second call based on the ascertaining.

Other methods and systems consistent with the principles of the invention also route a communication to a preferred device. A service center is operable to receive information pertaining to a communication to a user from a calling party, the communication to the user being initiated by an action of the calling party on a data network. The service center may also retrieve data corresponding to the user using the received information and determine a preferred device of the user based on the retrieved data. In addition, the service causes the initiation of a first call to a device of the calling party and the initiation of a second call to the preferred device of the user. Thereafter, the service center connects the first call and second call.

Other methods and systems consistent with the principles of the invention look up information pertaining to a user. A service center may be operable to receive a request for information pertaining to a user and retrieve data corresponding to the user. The service center also determines a state of at least one communication line associated with the user and determines a preferred device of the user based on the state. Thereafter, the service centers may provide information reflecting the preferred device to an initiating party based on the state.

BRIEF DESCRIPTION OF THE DRAWINGS

The accompanying drawings, which are incorporated in and constitute a part of this specification, illustrate one embodiment of the invention and, together with the description, serve to explain the principles of the invention.

FIG. 9 is a diagram of an exemplary user interface 900 displaying a contact list consistent with the present invention.

DETAILED DESCRIPTION

Reference will now be made in detail to exemplary embodiments of the present invention, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Overview

Methods and systems consistent with the present invention route a communication to a preferred device of a user. A service center that provides a service to the user is operable to receive information pertaining to a communication to the user from a calling party, retrieve data corresponding to the user using information pertaining to the communication, determine a preferred device of the user based on the retrieved data, ascertain whether the preferred device of the user requires a new mode of delivery, and route the communication to the preferred device of the user based on the ascertaining.

The service center is also operable to receive information pertaining to a communication to the user from a calling party, the communication to the user being initiated by an action of the calling party on the data network. The service center further may retrieve data corresponding to the user using the information, determine a preferred device of the user based on the retrieved data, initiate a first call to a device of the calling party, initiate a second call to the preferred device of the user, ascertain whether the preferred device of the user requires a new mode of delivery, and connect the first call and second call based on the ascertaining.

Methods and systems consistent with the present invention also look up information pertaining to a user. A service center that provides a service to the user is operable to receive a request for information pertaining to a user, then retrieve data corresponding to the user. The service center may also determine a state of at least one communication line associated with the user, determine a preferred device of the user based on the state, provide the state to an initiating party, and provide information reflecting the preferred device to the initiating party based on the state.

Network Environment

Figure 1:
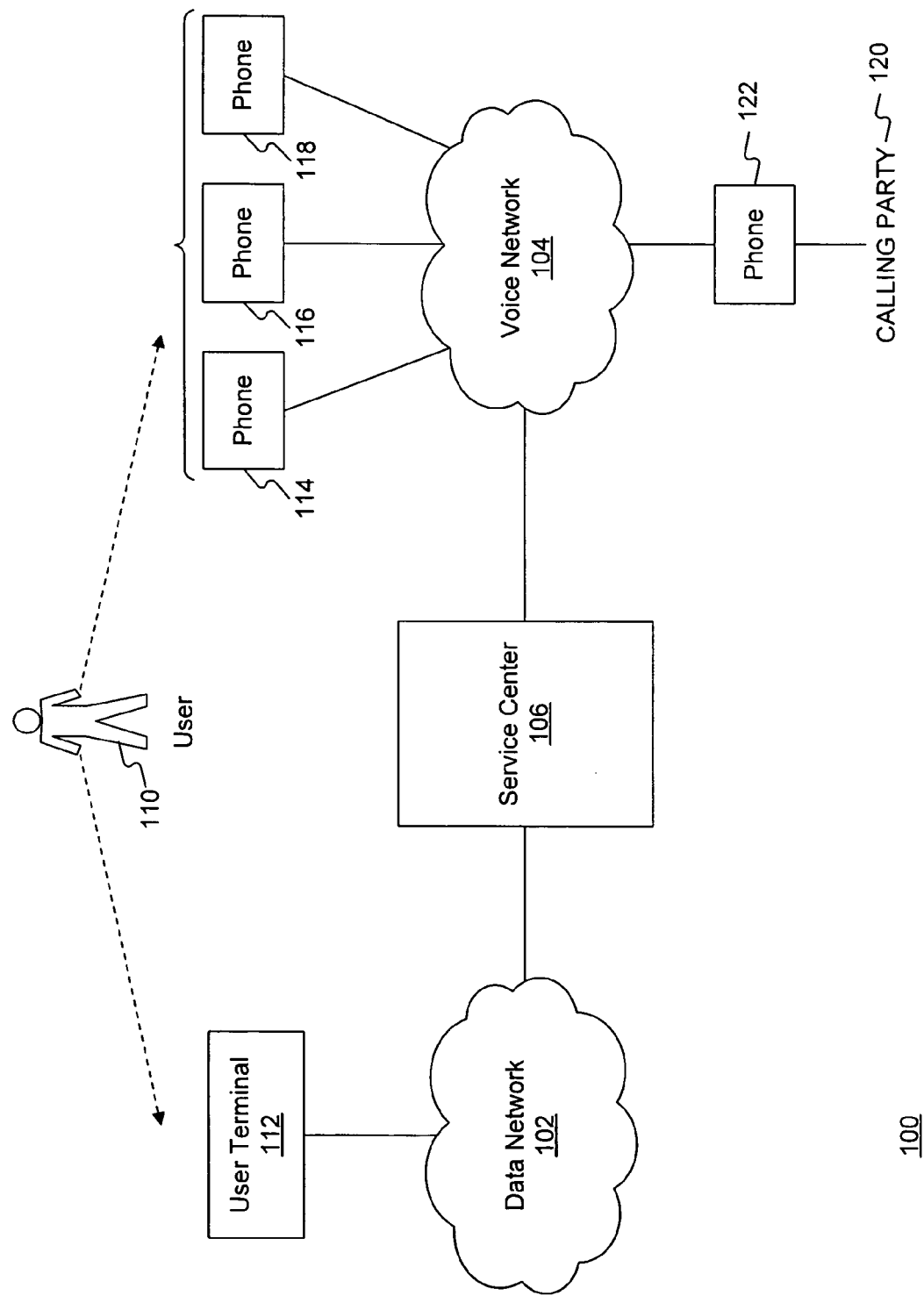
FIG. 1 is a diagram of an exemplary data processing and telecommunications environment in which features and aspects consistent with the principals of the present invention may be implemented.

FIG. 1 is a block diagram of a data processing and telecommunications environment 100, in which features and aspects consistent with the present invention may be implemented. The number of components in environment 100 is not limited to what is shown and other variations in the number of arrangements of components are possible, consistent with embodiments of the invention. The components of FIG. 1 may be implemented through hardware, software, and/or firmware. Data processing and telecommunications environment 100 may include a data network 102, a voice network 104, and a service center 106. A user 110 may use a user terminal 112 to interface with data network 102 and may use devices such as phones 114, 116, and 118 to interface with voice network 104. A calling party 120 may use a phone 122 to call a user, such as user 110, at any one of phones 114, 116, and 118.

Data network 102 provides communications between the various components depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. By way of example, data network 102 may be implemented through a wide area network (WAN), local area network (LAN), an intranet and/or the Internet. Further, the service center 106 may be connected to multiple data networks 102, such as, for example, to a wireless carrier network and to the Internet.

Voice network 104 may provide telephony services to allow a calling party, such as calling party 120, to place a telephone call to user 110. In one embodiment, voice network 104 may be implemented using a network, such as the Public Switched Telephone Network ("PSTN"). Alternatively, voice network 104 may be implemented on a voice-over-broadband network, such as a network using voice-over-Internet Protocol ("VoIP") technology. Additionally, in other embodiments, the voice network may be a video-over-broadband network, such as, for example, a network for providing 2-way video communications. In another example, the voice network may be a wireless broadband network, such as, for example, a network using WiFi (i.e., IEEE 802.11(b) and/or (g)). In yet another example, the voice network 104 may be a wireless voice network(s), such as, for example, a cellular or third-generation cellular network. In addition, voice network 104 may be implemented using any single one or combination of the above-described technologies consistent with the principles of the present invention. Further, service center 106 may be connected to multiple voice networks 104, such as for example, Verizon's™ Voice Network, voice networks operated by other carriers, and wireless carrier networks.

Service center 106 provides a platform for managing communications over data network 102 and voice network 104. Service center 106 also provides gateway functions, such as code and protocol conversions, to transfer communications between data network 102 and voice network 104. Service center 106 may be implemented using a combination of hardware, software, and/or firmware. For example, service center 106 may be implemented using a plurality of general purpose computers or servers coupled by a network (not shown). Although service center 106 is shown with direct connections to data network 102 and voice network 104, any number and type of network elements may be interposed between service center 106, data network 102, and voice network 104.

User terminal 112 provides user 110 an interface to data network 102. For example, user terminal 112 may be implemented using any device capable of accessing the Internet, such as a general purpose computer or personal computer equipped with a modem. User terminal 112 may also be implemented in other devices, such as the Blackberry™, and Ergo Audrey™. Furthermore, user terminal 112 may be implemented in wireless devices, such as pagers, mobile phones (with data access functions), and Personal Digital Assistants ("PDA") with network connections.

User terminal 112 also allows user 110 to communicate with service center 106. For example, user 110 may use instant messaging ("IM") to communicate with service center 106. In addition, user terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

Furthermore, user terminal 112 may communicate directly with service center 106. For example, a client application may be installed on user terminal 112, which directly communicates with service center 106. Also, user terminal 112 may communicate with service center 106 via a proxy.

Phones 114, 116, 118, and 122 interface with voice network 104. Phones 114, 116, 118, and 122 may be implemented using known devices, including wireline phones and mobile phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
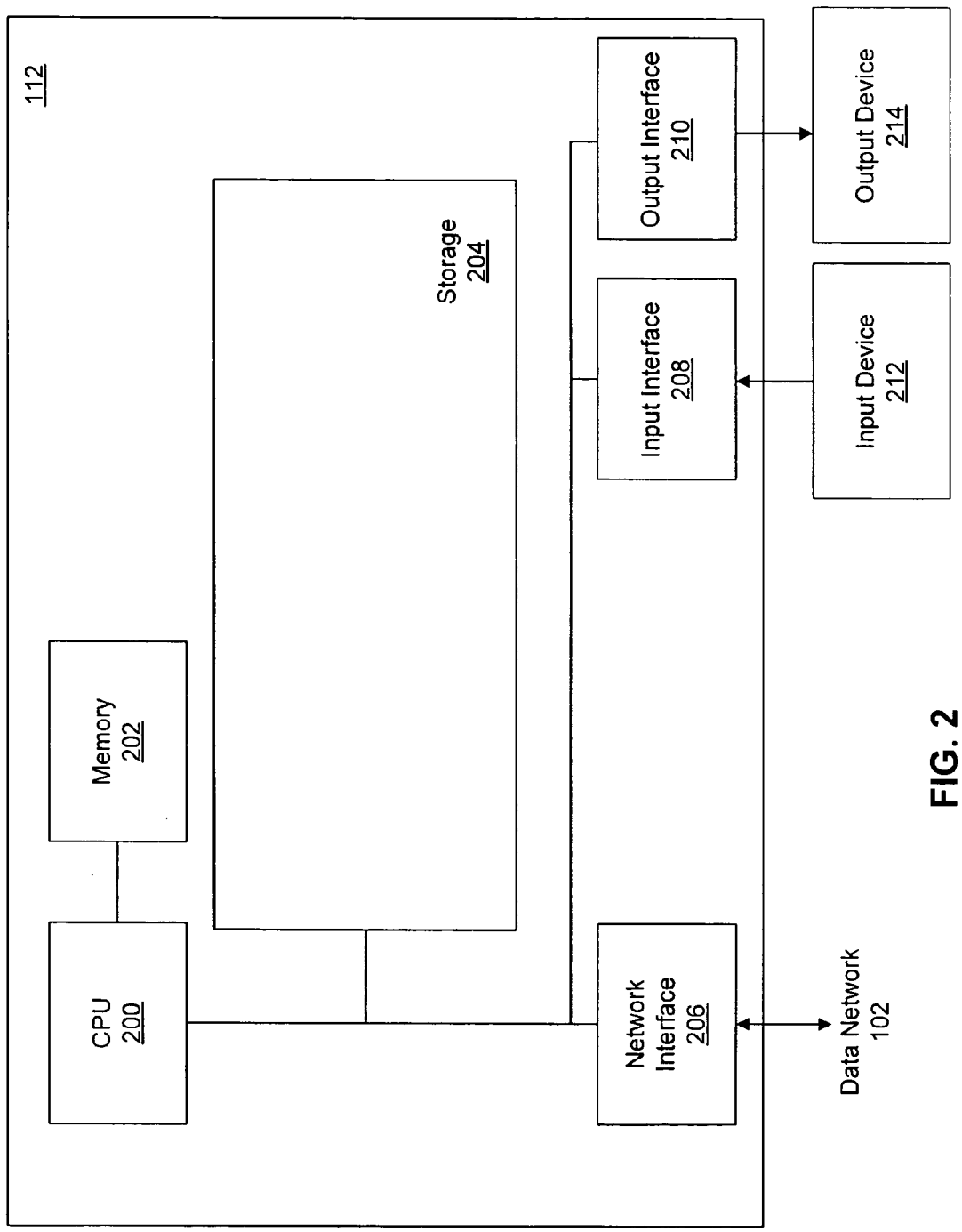
FIG. 2 is a diagram of an exemplary user terminal, consistent with the principals of the present invention.

FIG. 2 is a block diagram of a user terminal consistent with the present invention. User terminal 112 may include a central processing unit (CPU) 200, a memory 202, a storage module 204, a network interface 206, an input interface 208, an output interface 210, an input device 212, and an output device 214.

CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. CPU 200 may be implemented, for example, using a Pentium™ processor provided from Intel Corporation.

Memory 202 provides a primary memory for CPU 200, such as for program code. Memory 202 may be embodied with a variety of components of subsystems, including a random access memory ("RAM") and a read-only memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, CD ROM drive, DVD drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 may include, for example, program code for a calendar application, such as GroupWise provided by Novell Corporation or Outlook provided by Microsoft Corporation; a client application, such as a Microsoft Network Messenger Service (MSNMS) client or America Online Instant Messenger (AIM) client; and an Operating System (OS), such as the Windows Operation System provided by Microsoft Corporation. In addition, storage module 204 may include other program code and information, such as program code for TCP/IP communications; kernel and device drivers; configuration information, such as a Dynamic Host Configuration Protocol (DHCP) configuration; a web browser, such as Internet Explorer provided by Microsoft Corporation, or Netscape Communicator provided by Netscape Corporation; and any other software that may be installed on user terminal 112.

Network interface 206 provides a communications interface between user terminal 112 and data network 102. Network interface 206 may receive and transmit communications for user terminal 112. For example, network interface 206 may be a modem, or a local area network ("LAN") port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3:
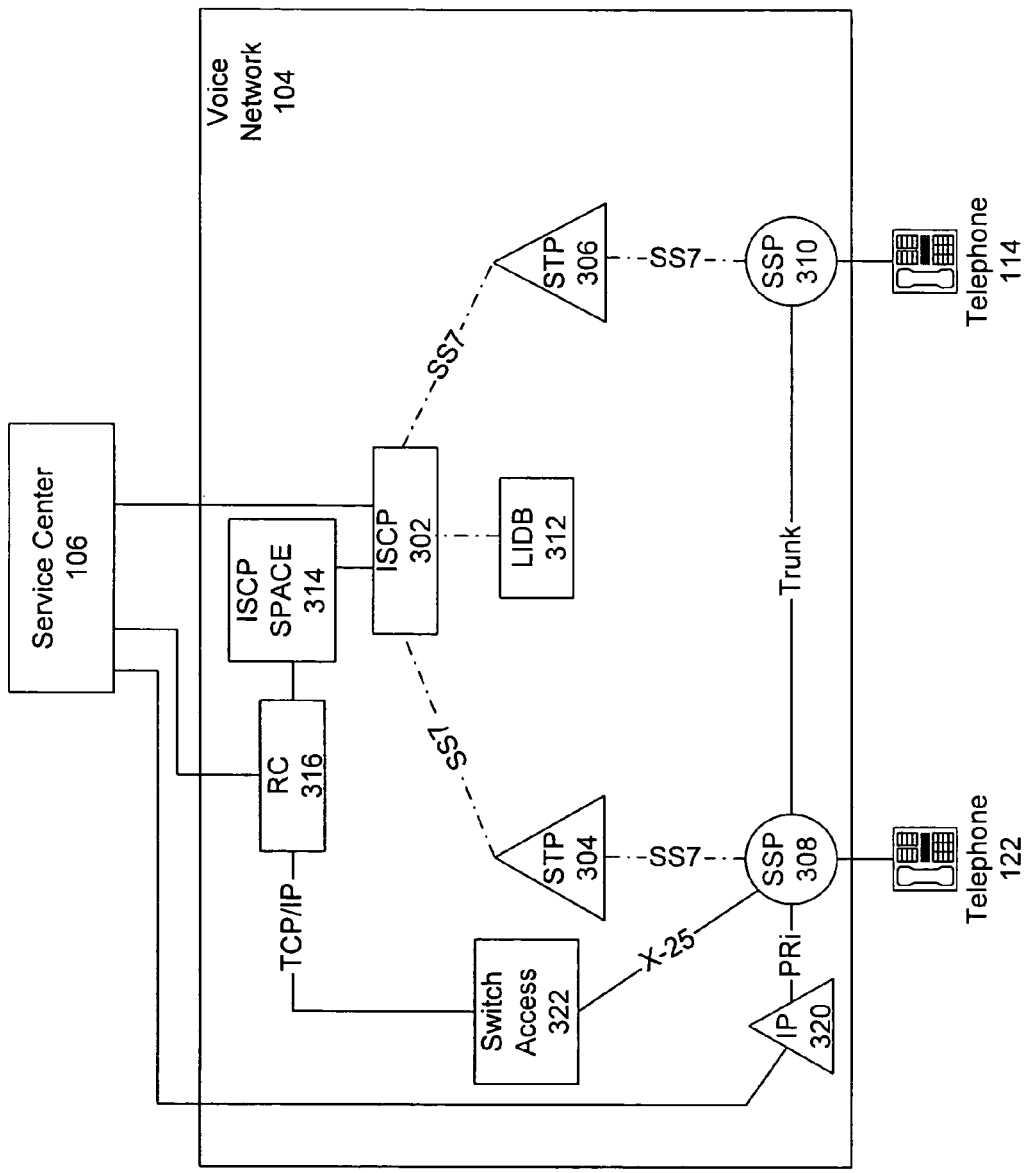
FIG. 3 is a diagram of a voice network, consistent with the principles of the present invention.

FIG. 3 is a diagram of a voice network, consistent with the principles of the present invention. As shown, voice network 104 includes an intelligent service control point (ISCP) 302, service transfer points (STP) 304 and 306, service switching points (SSP) 308 and 310, a line information database (LIDB) 312, an ISCP Service Provisioning And Creation Environment (SPACE) 314, a Recent Change Environment 316, an Intelligent Peripheral (IP) 320, and a switch access 322. Although this embodiment of a voice network 104 is described as a PSTN, as discussed above in other embodiments, the voice network 104 may be, for example, a voice-over-video-over-broadband network a wireless broadband, a wireless voice network, etc.

Voice network 104 may be implemented using the PSTN and SS7 as a signaling protocol. As is known to those skilled in the art, the SS7 protocol allows voice network 104 to provide features, such as call forwarding, caller-ID, three-way calling, wireless services such as roaming and mobile subscriber authentication, local number portability, and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point (SCP) or an Advanced Intelligent Network (AIN) SCP. ISCP 302 provides translation and routing services of SS7 messages to support the features of voice network 104, such as call forwarding. In addition, ISCP 302 may exchange information with the service center 106 using TCP/IP or SS7. ISCP 302 may include service logic used to provide a switch, such as SSP 308 or 310, with specific call processing instructions. ISCP 302 may also store data related to various features that a user may activate. Such features may include, for example, call intercept and voice mail. ISCP 302 may be implemented using a combination of known hardware and software. ISCP 302 is shown with a direct connection to service center 106 and a connection through ISCP SPACE 314, however, any number of network elements including routers, switches, hubs, etc., may be used to connect ISCP 302, ISCP SPACE 314, and service center 106. Further, information exchanged between the ISCP 302 and service center 106 may use, for example, the SR-3389 General Data Interface (GDI) for TCP/IP.

STPs 304 and 306 relay SS7 messages within voice network 104. For example, STP 304 may route SS7 messages between SSPs 308 and 310. STP 304 or 306 may be implemented using known hardware and software from manufacturers such as NORTEL™ and LUCENT Technologies™.

SSPs 308 and 310 provide an interface between voice network 104 and phones 122 and 118, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 and user 110 (FIG. 1). For example, SSPs 308 and 310 may exchange SS7 messages, such as TCAP messages, within message signal units ("MSU") to control calls, perform database queries to LIDB 312, and provide maintenance information.

Line Information Database (LIDB) 312 comprises one or more known databases to support the features of voice network 104. For example, LIDB 312 may include subscriber information, such as a service profile, name and address, and credit card validation information. Although, in this figure, LIDB 312 is illustrated as directly connected to ISCP 302, LIDB 312 may be connected to ISCP 302 through an STP (e.g., 304 and 306). Additionally, this communication link may use, for example, the GR-2838 General Dynamic Interface (GDI) for SS7.

ISCP Service Provisioning and Creation Environment (SPACE) 314 may be included as part of the ISCP 302 or be separate from the ISCP 302. For example, the Telcordia™ ISCP may include an environment similar to SPACE 314 as part of the product. Further, ISCP SPACE 314 may include one or more servers. ISCP SPACE 314 is the point in the ISCP platform where customer record updates may be made.

In one embodiment, customer records may be stored in the ISCP SPACE 314 such that the records may be updated and sent to the ISCP 302. These records may include information regarding how to handle calls directed to the customer. For example, these customer records may include information regarding whether or not calls for the customer are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Additionally, the voice network 104 may include one or more recent change engines 316 such as, for example, an Enterprise Recent Change engine (eRC); an Assignment, Activation, and Inventory System (AAIS); or a multi-services platform (MSP). As an example, the eRC and AAIS may be used in voice networks 104 located in the western part of the United States, while an MSP may be used in networks in the eastern part. The recent change engines may be used to update switch and ISCP databases. For example, a recent change engine may deliver database updates to SSPs and to ISCPs, such that when updating databases, these recent change engines emulate human operators. Additionally, if the instructions are to be sent to an ISCP 302, the recent change engine may first send the instructions to the ISCP SPACE 314, which then propagates the instructions to the ISCP 302 as discussed above. Further, an MSP may be used, for example, for providing updates to both the SSPs 308 or 310 and the ISCPs 302. Or, for example, an eRC may be used for providing updates to the SSPs 308 or 310, while an AAIS is used for providing updates to the ISCPs 302.

Updates sent to the SSPs 308 or 310 may be sent from the recent change engine 316 via a switch access 322 that may, for example, convert the updates into the appropriate protocol for the SSP 308 or 310. For example, recent change engine 316 may send updates to the SSPs 308 or 310 via TCP/IP. Switch access 322 may then convert the updates from TCP/IP to X.25. Switch access 322 may be implemented using hardware and/or software. The connections described above may include any number of elements, such as, for example, switches, routers, hubs, etc. and may be, for example, an internal data network for the voice network 104.

The voice network 104 may also include one or more intelligent peripherals (IP). For example, in FIG. 3, an IP 320 is illustrated as being connected to SSP 308. These IPs may be used for providing functions for interaction between users and the voice network, such as voice mail services, digit collection, customized announcements, voice recognition, etc. Moreover, the communications between SSP 308 and IP 320 may use the Primary Rate interface (PRi) (e.g., the 1129 protocol) protocol. Additionally, IP 320 may be capable of sending and receiving information to/from Service Center 106. These communications may use, for example, the SR-3511 protocol. Further, although FIG. 3 illustrates this connection as a direct connection, this connection may include any number of elements including routers, switches, hubs, etc., and may be via, for example, an internal data network for the voice network 104.

Figure 4:
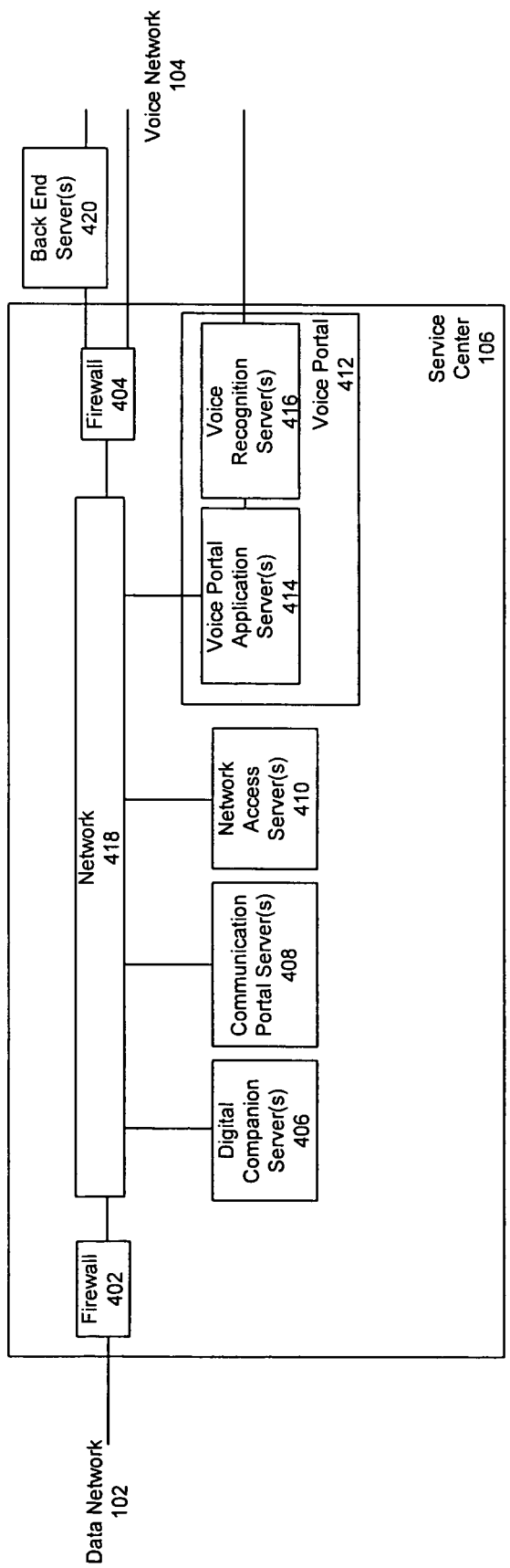
FIG. 4 is a block diagram of a service center, consistent with the principles of the present invention.

FIG. 4 is a block diagram of a service center 106, consistent with the principles of the present invention. As shown, service center 106 may include firewalls 402 and 404, one or more digital companion servers 406, one or more communication portal servers 408, one or more network access servers 410, and a voice portal 412. Voice portal 412 may include a one or more voice portal application servers 414 and a one or more voice recognition servers 416. A network 418 may be used to interconnect the firewalls and servers. Additionally, back end server(s) 420 may be provided between the service center 106 and the voice network 104.

Firewalls 402 and 404 provide security services for communications between service center 106, data network 102, and voice network 104, respectively. For example, firewalls 402 and 404 may restrict communications (via network 102) between user terminal 112 (FIG. 1) and one or more servers within service center 106. Any appropriate security policy may be implemented in firewalls 402 and 404 consistent with the principles of the present invention. Firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any appropriate type of network, such as an Ethernet or FDDI network. Additionally, network 418 may also include switches and routers as appropriate without departing from the scope of the invention. Further, additional firewalls may be present in the network 418, for example, to place one or more of servers 406, 408, 410, or voice portal 412 behind additional firewalls.

Each server (406, 408, 410, 414, 416, 420) may be any appropriate type of server or computer, such as a Unix or DOS-based server or computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a digital companion server 406 may provide the software and hardware for providing specific services of the service center to a customer, that is, a user that subscribes to various services of service center 106. Exemplary services include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, real-time call management, forwarding calls to a preferred device in a proper mode of delivery, permitting the customer to look up the preferred devices of other customers, etc.

A communication portal server 408 may provide the hardware and software for managing a customer's account and interfacing with customer account information stored by the provider of customer's voice network 104. Network access servers 410 may provide the hardware and software for sending and receiving information to voice network 104 in processing the applications provided by service center 106. For example, network access servers 410 may be used for transmitting and/or receiving information from/to an ISCP 302 or an SSP 308 or 310 of voice network 104.

Voice portal 412 includes software and hardware for receiving and processing instructions from a customer via voice. For example, a customer may dial a specific telephone number for voice portal 412. Then the customer, using speech, may instruct service center 106 to modify the services to which the customer subscribes. Voice portal 412 may include, for example, a voice recognition function 416 and an application function 414. Voice recognition function 416 may receive and interpret dictation, or recognize spoken commands. Application function 414 may receive, for example, the output from voice recognition function 416, convert it to a format suitable for service center 106 and forward the information to one or more servers (406, 408, 410) in service center 106.

Figure 5:
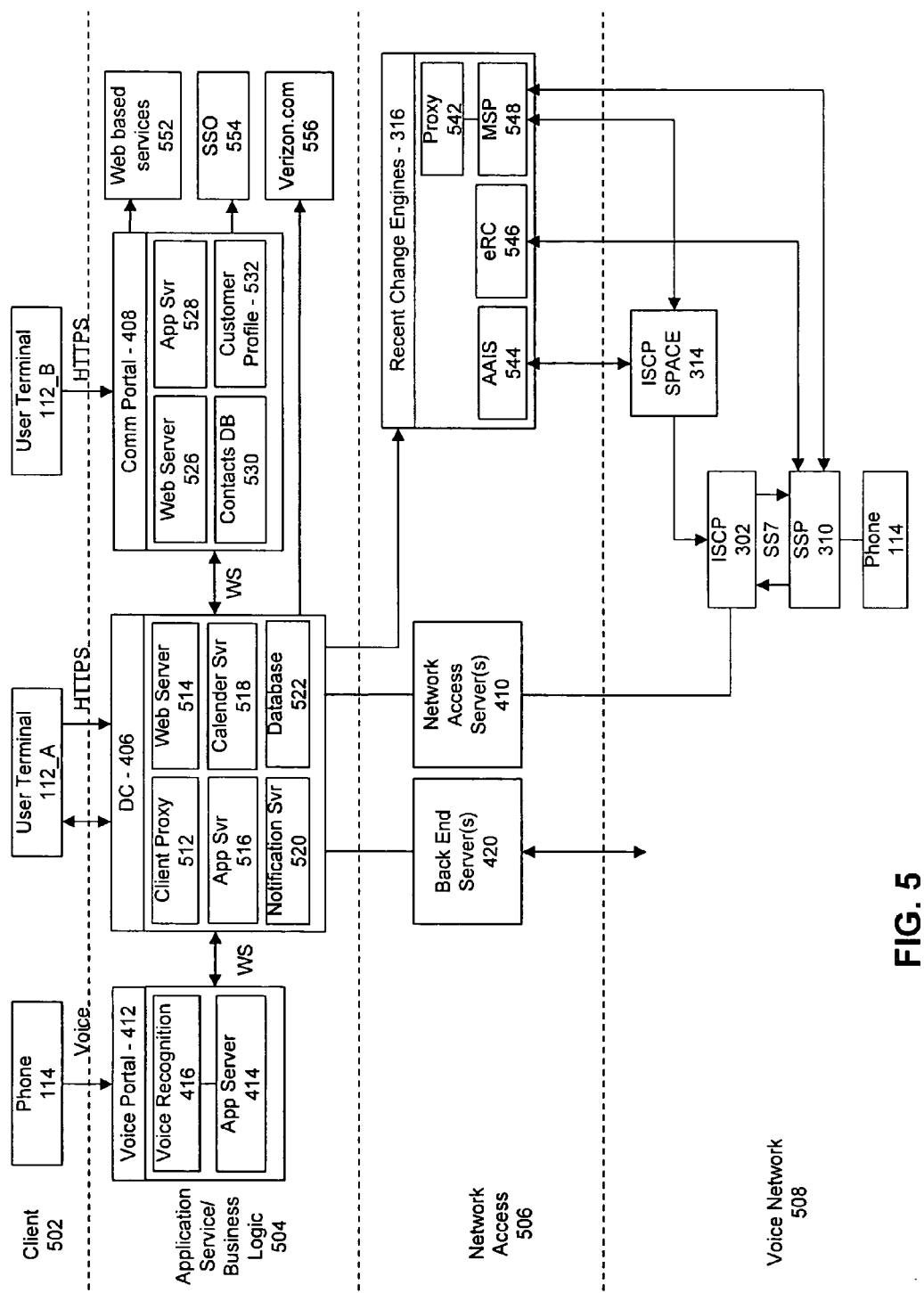
FIG. 5 illustrates a logical architecture of an exemplary system, consistent with the present invention.

FIG. 5 illustrates a logical architecture of an exemplary system, consistent with the present invention. As illustrated, the logical architecture may be split into four planes: client side plane 502, application service plane 504, network access plane 506, and voice network plane 508.

Client side plane 502 includes user terminals 112_A and 112_B that a user may use to send and/or receive information to/from the service center 106. Additionally, client side plane 502 includes the user's phone(s) 114. As discussed above, user terminals 112 may be any type of device a user may use for communicating with Service Center 106. For example, user terminal 112_A may be a PDA running a program for communicating with the Service Center 106, while user terminal 112_B may be a desktop type computer running a web browser for communicating with the Service Center 106 via the Internet. Additionally, the user may have one or more phones 114, such as, for example, one or more standard landline telephones and/or wireless phones, each associated with a corresponding communication line identified by a telephone number.

Application service plane 504 includes the digital companion server(s) 406, communication portal server(s) 408, and voice portal 412. These entities may communicate between one another using, for example, web services or any other suitable protocols. Web services are a standardized way of integrating Web-based applications using the Extensible Markup Language (XML), Simple Object Access Protocol (SOAP), Web Services Description Language (WSDL) and Universal Description, Discovery and Integration (UDDI) open standards over an Internet protocol (IP) backbone.

As illustrated, digital companion server 406 may provide the following functions: a client proxy function 512, a web server function 514, an application server function 516, a calendar server function 518, a notification server function

520, and a database function 522. Each of these functions may be performed in hardware, software, and/or firmware. Further, these functions may each be executed by a separate server, split across multiple servers, included on the same server functions, or any other manner.

Client proxy function 512 provides a proxy function for the digital companion that may be used for security purposes. Client proxy function 512 may be included in a separate server such that all communications sent from the other digital companion functions/servers to a user terminal 112 via data network 102 go through client proxy 512. Also, if client proxy 512 is included on a separate server, for example, an additional firewall may be provided between client proxy 512 and other digital companion servers to provide additional security.

Web server function 514 receives traffic over the data network 102 from a customer. For example, web server function 514 may compare a standard web server that a customer may access using a web browser program, such as Internet Explorer or Netscape Communicator.

Application server function 516 encompasses the general functions performed by the digital companion server(s) 406. For example, these functions may include interfacing with the various other digital companion functions to perform specific services provided by the service center. These services may include, for example, interfacing with other function(s), software, and/or hardware to provide a customer with the capability of managing their calls online. This capability may include services such as adding contacts to their address book from a history of calls made or received by the customer, making calls directly from their address book, scheduling a call to be placed at a specific time, or determining the name and/or address associated with a phone number. Additionally, these services may include listening to voice mail on-line, forwarding calls based on a scheduler and/or the calling parties number, setting up conference calls on-line, enabling call management with user intervention in real-time, forwarding calls to a preferred device in a proper mode of delivery, looking up the preferred devices of other customers, etc.

Additionally, application server function 516 may interface with one or more external devices, such as an external web server, for retrieving or sending information. For example, application server function 516 may interface with a voice network's data center 556 (e.g., verizon.com) to determine the services to which the customer subscribes (e.g., call waiting, call forwarding, voice mail, etc.).

Calendar server function 518 may provide the capability of scheduling events, logging when certain events occurred, triggering the application-functions to perform a function at a particular time, etc.

Notification server function 520 provides the capability to send information from the service center 106 to a user terminal 112. For example, notification server function 520, at the direction of application server function 516, may send a notification to user terminal 112 that the user is presently receiving a phone call at the user's phone 114. This notification may be, for example, an instant message pop-up window that provides an identification of the caller as well as the number being called. The notification may also have a number of user-selectable buttons or items associated with it that enable the user to manage a call in real-time.

Database function 522 provides the storage of information useable by the various applications executed by the digital companion servers. These databases may be included in, for example, one or more external storage devices connected to the digital companion servers. Alternatively, the databases may be included in storage devices within the digital companion servers themselves. The storage devices providing database function 522 may be any type of storage device, such as for example, CD-ROMs, DVD's, disk drives, magnetic tape, etc.

As discussed above, communication portal server(s) 408 provide the hardware and software for managing a customer's account and interfacing with customer account information stored by the provider of customer's voice network 104. As illustrated in FIG. 5, a communication portal server 408 may provide the following functions: a web server function 526, an application server function 528, a contacts database function 530, and/or a customer profile function 532. Each of these functions may be performed by a separate server, split across multiple servers, included on the same server functions, or any other manner.

Web server function 526, as with web server function 514 of the digital companion servers, provides functionality for receiving traffic over data network 102 from a customer. For example, the web server may be a standard web server that a customer may access using a web browser, such as Internet Explorer or Netscape Communicator.

Application server function 528 encompasses the general functions performed by communication portal servers 408. For example, these functions may include interfacing with voice network 104 to retrieve and/or modify customer profile information, and creating and editing an address book for the user. Additionally, application server function 528 may include the functionality of sending and/or receiving information to/from external servers and/or devices. For example, communication portal servers 408 may be connected to a network, such as, the Internet. Application server function 528 may then provide connectivity over the Internet to external servers 552 that provide web services, such as the Superpages web page. Application server function 528 could then contact external services 552 to retrieve information, such as an address for a person in the user's address book.

In another example, application server function 528 of communication portal 408 may interface a single sign on (SSO) server 554. SSO 554 may be used to allow users to access all services to which the user subscribes, on the basis of a single authentication that is performed when they initially access the network.

Moreover, application server function 528, similar to application server 516, may provide functionality to facilitate services performed by the service center. These services may include, for example, interfacing with other function(s), software, and/or hardware to provide a customer with the capability of managing their calls online. This capability may include services such as adding contacts to their address book from a history of calls made or received by the customer, making calls directly from their address book, scheduling a call to be placed at a specific time, or determining the name and/or address associated with a phone number. Additionally, these services may include listening to voice mail on-line, forwarding calls based on a scheduler and/or the calling parties number, setting up conference calls on-line, enabling call management with user intervention in real-time, forwarding calls to a preferred device in a proper mode of delivery, looking up the preferred devices of other customers, etc.

Contacts database 530 includes storage devices for storing an address book for the user. This address book may be any appropriate type of address book. For example, the user's address book may include the names, phone numbers, and addresses of people and/or organizations. These storage devices may be internal or external to the communication portal servers 406 or some combination in between. In addition, these storage devices may be any type of storage device, such as magnetic storage, memory storage, etc.

Customer profile database 532 includes storage devices for storing customer profile information for the user. These storage devices may be the same or separate storage devices used for the contacts database. The customer profile may include information regarding the user's account for their voice network. For example, this information may include the user's name, billing address, and other account information. Additionally, the customer profile may include information regarding voice services to which the user subscribes, such as, for example, call waiting, voice mail, etc.

Application services plane 504 of the architecture may also include a voice portal 412. As discussed above, voice portal 412 may include, for example, a voice recognition function 416 and an application server function 414, and be used for receiving and processing instructions from a customer via voice. The voice recognition function may be implemented using hardware and/or software capable of providing voice recognition capabilities. This hardware and/or software may be a commercially available product, such as the Voice Application platform available from Tellme Networks, Incorporated. Application server function 414 of voice portal 412 may include hardware and/or software for exchanging information between digital companion servers 406 and voice recognition function 416. Additionally, application server function 414 may be included on a separate server, included in the hardware and software providing voice recognition function 416, included in digital companion servers 406, etc.

Network Access plane 506 of the architecture includes the functions for providing connectivity between application service plane 502 and voice network 104. For example, this plane may include recent change engines 316, network access servers 410, and/or back end servers 420.

As discussed above, recent change engines 316 may be used to update switches and ISCP databases included in voice network 104. In one embodiment, recent change engines 316 may include an AAIS 544, an eRC 546, and/or an MSP 548. Additionally, a proxy 542 may be used between the digital companion servers 406 and the recent change engines 542 for security purposes.

Network access servers 410 may be included in service center 106 and may provide the hardware and software for sending and receiving information to voice network 410 in processing the applications provided by the service center. For example, network access servers 410 may include a Caller ID (CID) functionality for retrieving caller ID information from voice network 104, a click to dial (CTD) functionality for instructing an intelligent peripheral (IP) in the voice network to place a call via an SSP, and/or a real time call management (RTCM) functionality for interfacing with an ISCP of the voice network.

Network Access plane 506 may also include one or more back end server(s) 420. Back end server(s) 420 may include hardware and/or software for interfacing service center 106 and voice network 104. Back end server(s) 420 may be connected to service center 106 by a network, by a direct connection, or in any other suitable manner. Further, back end server(s) 420 may connect to one or more devices in voice network 104 by a network, a direct connection, or in any other suitable manner.

Back end server(s) 420 may include, for example, a server providing a voice mail retrieval and notification function. This voice mail retrieval and notification function may include the capability to receive notifications when a user receives a voice mail, physically call a user's voice mail system, enter the appropriate codes to retrieve the voice mail, retrieve the voice mail, convert the voice mail to a digital file, and send it to digital companion servers 406.

Additionally, back end server(s) 420 may also include, for example, a directory assistance server. This directory assistance server may interface service center 106 with a Reverse Directory Assistance Gateway (RDA Gateway) of the voice network 104. An RDA Gateway is a device for issuing requests to a Data Operations Center (DOC) of voice network 104 for name and/or address information associated with a phone number and receiving the name and/or phone number in response to this request.

In another example, back end server(s) 420 may include a wireless internet gateway that is used for interfacing with a mobile switching center (MSC) of a wireless voice network. As with the above-described back end server(s) 420, this wireless internet gateway may be used for converting requests and information between the formats used by service center 106 and those used by the wireless voice network.

In yet another example, back end server(s) 420 may include a conference blasting server for instructing a conference bridge in voice network 106 to dial out via an SSP to the participants of a voice conference. Alternatively, for example, the back end server(s) may include a server for instructing an IP of the voice network to place a call between two parties by dialing out to each of the parties. The back end server(s) may also include the capability to instruct the bridge or IP device to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming device may buffer or record the signals to permit the user to pause, rewind, and/or fast-forward thru the conference.

In yet another example, back end server(s) 420 may include a Single Number Short Message Service (SN SMS) server for interfacing service center 106 with a Short Message Service (SMS) gateway in voice network 104. This may be used to permit the customer to have SMS messages addressed to their home phone number directed to an SMS capable device of the users choosing.

Voice network plane 508 includes the hardware and software included in voice network 104, as discussed above with reference to FIG. 3. For example, voice network plane 508 may include ISCP SPACE 314, ISCP 302, intelligent peripheral 320, and SSP 308. Additionally, voice network plane 508 may also include the hardware and software included in a wireless carrier's network, such as, for example, the mobile switching center, etc.

System Operation

Figure 6A:
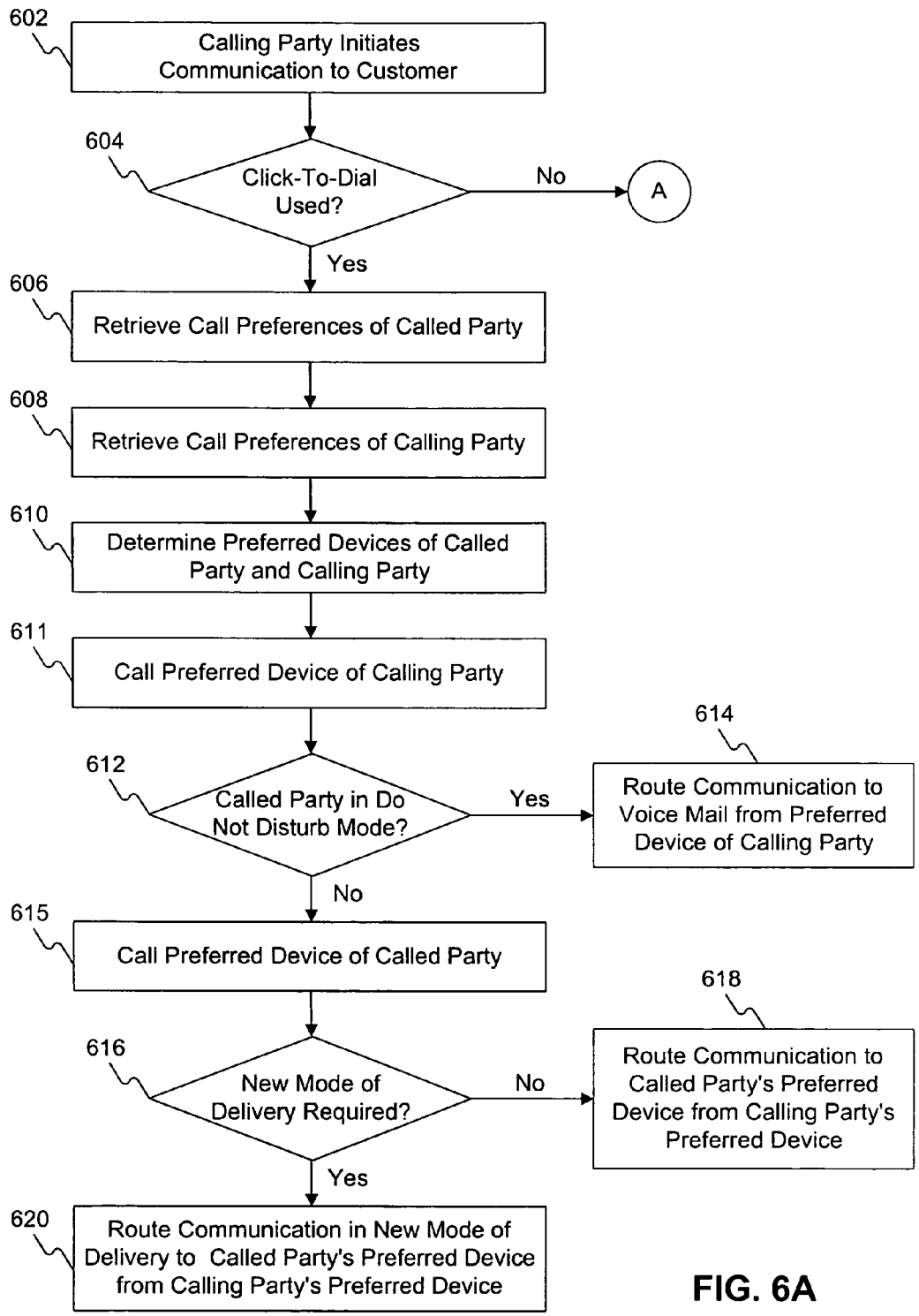
FIGS. 6A and 6B comprise a diagram of an exemplary flowchart of a method for forwarding a communication to a preferred device consistent with the principles of the present invention.
Figure 6B:
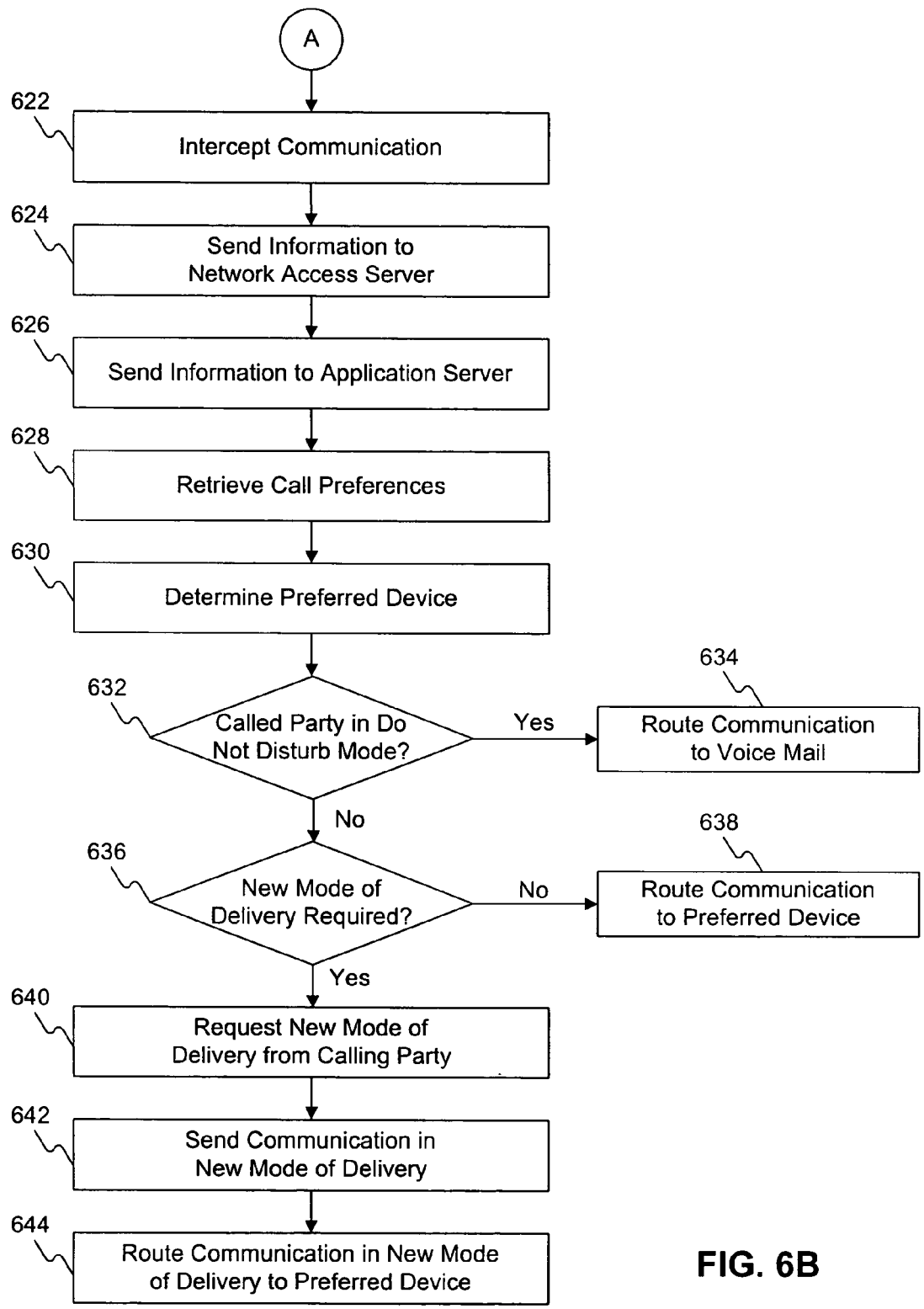

FIGS. 6A and 6B comprise a diagram of an exemplary flowchart of a method for forwarding a communication to a preferred device in a manner consistent with the present invention. Although the steps of the flowchart are described in a particular order, one skilled in the art will appreciate that these steps may be performed in a modified or different order. Further, one or more of the steps in FIGS. 6A and 6B may be performed concurrently or in parallel.

As illustrated in FIGS. 6A and 6B, a calling party first initiates a communication to a digital companion customer (step 602). For example, calling party 120 may use a phone, such as phone 122, to call a digital companion customer, such as user 110 at a specific telephone number associated with user 110. Alternatively, a calling party may use other devices to establish communications other than phone calls with a digital companion customer. Moreover, the calling party may be a digital companion customer that uses a click-to-dial operation to call another digital companion customer. In a click-to-dial operation, for example, a calling party may call a PSTN device (such as a standard wire-line telephone) from a PSTN device of the calling party by initiating an action on a packet network (e.g., data network). More particularly, the calling party may click on a hyperlink, button, or other indicator for the calling party presented on a display of a terminal 112. In response, an intelligent peripheral (IP) 320 (FIG. 3) is notified and calls both the calling party and the called party on their respective PSTN devices. The IP may then bridge the two calls so that the calling party and the called party may communicate with each other. Click-to-dial is more fully explained in U.S. patent application Ser. No. 10/317,937, entitled "METHODS AND SYSTEMS FOR MAKING TELEPHONE CALLS," filed Dec. 12, 2002, which is herein incorporated by reference in its entirety.

In a situation where the calling party is a digital companion customer using click-to-dial or similar functionality to initiate the communication (Step 604—Yes), the calling party may click on a hyperlink, button, or other indicator on a user terminal 112 to start the communication. An application server, such as application server 516, may proceed to retrieve call preferences of the called party using information garnered from the calling party's selection (e.g., called party name, called party number, etc.) (step 606). For example, application server 516 may retrieve call preference information from database 522, customer profile database 532, or another database used to store customer-related data. The call preference information may include, for example, call block lists, lists of forwarding devices or telephone numbers, voice mail preferences, lists of recordings that the customer can set as pre-recorded messages, etc. An application server 516 may also retrieve call preferences of the calling party in a similar manner using information identifying the calling party (e.g., calling party name, calling party number, etc.) (step 608). Call preferences of the calling party may be retrieved because in this case the calling party is also a digital companion customer.

Once the various call preferences have been retrieved, application server 516 may determine the preferred device for the called party, or the preferred devices for both the called party and the calling party (step 610). The preferred device may be ultimately determined by a number of factors. For example, application server 516 may be set to recognize a device indicated in the retrieved call preferences as the preferred device. The device indicated in the call preferences may be different depending on the disposition of the call. For example, a customer may select different devices for answering calls, voice mail, screening calls, etc.

In one embodiment, application server 516 may instead recognize a predetermined default device as a preferred device. A default device may be selected, for example, when a customer neglects to explicitly specify a device as the preferred device.

In another embodiment, application server 516 may instead recognize the last device used by a customer as the preferred device. The last device used may also be selected, for example, when a customer neglects to explicitly specify a device as the preferred device. The customer also may explicitly select an option that specifies the last device used as the preferred device.

In yet another embodiment, application server 516 may instead determine a preferred device based on a customer's location. For example, if the customer is logged on to digital companion server 406 via a computer in the customer's office, then application server 516 may determine that the computer is the customer's preferred device. Or, for example, the customer may specify that a wireless device of the customer should be set as the preferred device if the customer is logged on to digital companion server 406 via a wireless device, such as the customer's wireless phone or a PDA. Additionally, in another example, the customer may have a device with Global Positioning System (GPS) capabilities such that the customer's location is forwarded to digital companion server 406. The customer in such an example may then specify what device should be assigned as the preferred device based upon the information regarding the customer's location.

Application server 516 may also receive information from calendar server 518 concerning preferred devices. For example, calendar server 518 may maintain information that indicates which device is specified as a preferred device for a customer in a particular time period (e.g., specific times, days, months, etc.). As such, a customer may, in advance, specify time periods during which different devices are designated as preferred devices. Whenever there is a time period in which the customer scheduled a specific preferred device, calendar server 518 notifies application server 516 of the preferred device to be set for the customer.

Application server 516 may also determine a preferred device to be overridden by certain states that a customer chooses. For example, a customer may opt to enter into a Do Not Disturb mode. If so, then the Do Not Disturb mode overrides any indication of a preferred device and communications may not be directed to the preferred devices. Instead, communications may be routed to another predetermined destination, which may or may not be the preferred device. A Do Not Disturb indication may be stored with the user preference information for the customer in the Do Not Disturb mode (e.g., in database 522, 532, etc.). A Do Not Disturb mode may also be used in conjunction with calendar server 518 so that a customer can schedule particular periods of time to enter into a Do Not Disturb mode.

After determining the preferred devices for the called party and the calling party, application server 516 causes the preferred device of the calling party to be signaled from an IP, in accordance with click-to-dial operations (step 611). For example, application server 516 may send IP 320 information reflective of the preferred device of the calling party. The IP may play a recording for the calling party indicating, for example, that the communication is progressing. In situations where the preferred device of only the called party was determined, application server 516 may cause a default device, such as the device used by the calling party to initiate the communication, to be signaled from an IP.

In one aspect of the invention, instead of proceeding with normal click-to-dial operations, after the preferred device of the called party is determined, application server 516 or IP 320 may send, to the calling party's preferred device or to the device used by the calling party to initiate communications, information indicating that the calling party should contact the called party at the called party's preferred device. The information may include a phone number, IP address, or other identifier of the called party's preferred device. The calling party may thereafter establish a direct communication connection with the called party's preferred device, ending the process of forwarding a communication to a preferred device.

Application server 516 also determines whether the called party is in a Do Not Disturb mode (step 612). In a Do Not Disturb mode, the customer (e.g., called party) does not currently wish to be directly contacted. If the called party is in a Do Not Disturb mode, then application server 516 causes the communication from the calling party to be routed to voice mail (step 614). The communication is routed to voice mail because the customer is not considered to have a preferred device. One of ordinary skill in the art will appreciate that other actions may be taken instead of sending the communication to voice mail. For example, a recording may be provided to the calling party that does not allow for the calling party to leave a message.

If application server 516 determines that the called party is not in a Do Not Disturb mode, then application server 516 causes communications to be established with the preferred device of the called party (step 615). For example, an IP, such as IP 320 may call the preferred device of the called party using information from application server 516 that is reflective of the called party's preferred device. Application server 516 then determines whether a new mode of delivery is required (step 616). A new mode of delivery to the preferred device of the called party may be needed, for example, if the calling party's preferred device is currently using a format that differs from the format required for the called party's preferred device. For example, if the called party's preferred device is a pager or SMS (Short Message Service) device and the calling party's preferred device is a landline phone, then a call cannot be completed as though two phones were communicating with each other. Instead, if possible, a phone number would need to be left in the case of a pager, and an SMS message would need to be sent in the case of an SMS device.

If a new mode of delivery is not required, then application server 516 causes the communication to be routed to the called party's preferred device from the calling party's preferred device (step 618). For example, application server 516 may send an indication to IP 320 (via network access server 410) that IP 320 should proceed to bridge the call to the calling party and the call to the called party. Thereafter, the calling party and called party may communicate with each other. Alternatively, in a situation when IP 320 is unable to bridge calls to the calling party and called party, application server 516 or IP 320 may send, to the calling party's preferred device or to the device used by the calling party to initiate communications, information indicating that the calling party should contact the called party at the called party's preferred device. The information may include a phone number, IP address, or other identifier of the called party's preferred device. The calling party may thereafter establish a direct communication connection with the called party's preferred device, ending the process of forwarding a communication to a preferred device.

If a new mode of delivery is required, then the communication is routed to the called party's preferred device in the new mode of delivery (step 620). More particularly, the type of incoming data associated with the communication to the calling party may be changed to match the type of data required for the called party's preferred device. For example, if the calling party's preferred device is a mobile phone and the called party's preferred device is a pager, then a new mode of delivery may be needed. Application server 516 may automatically send the pager a phone number where the calling party may be reached. This phone number may be the number of the current preferred device of the calling party, or it may be a predetermined phone number previously set by the calling party. Alternatively, application server 516 may prompt the calling party to enter a phone number instead of automatically providing one. More generally, application server 516 may provide a user interface to the calling party that presents the calling party with an appropriate overlay to communicate with the called party's preferred device. For example, if the called party's preferred device is an SMS device, application server 516 may provide the calling party an overlay permitting the calling party to enter an SMS message.

Application server 516 may then send, via network access server 410, an indication to IP 320 that IP 320 should proceed to bridge the call to the calling party and the call to the called party. Thereafter, the calling party and called party may communicate with each other. Alternatively, in a situation when IP 320 is unable to bridge calls to the calling party and called party, application server 516 or IP 320 may send, to the calling party's preferred device or to the device used by the calling party to initiate communications, information indicating that the calling party should contact the called party at the called party's preferred device. The information may include a phone number, IP address, or other identifier of the called party's preferred device. The calling party may thereafter establish a direct communication connection with the called party's preferred device, ending the process of forwarding a communication to a preferred device.

When click-to-dial is not used to initiate the communication (Step 604—No), the communication may be routed from a phone to a voice network, such as voice network 104, where an SSP 308 or 310 may intercept the communication (step 622). In one aspect of the invention, SSP 308 or 310 may intercept the communication because it encountered a trigger, such as a terminating attempt trigger or a specific digit string trigger, associated with the communication. For example, a trigger may be set at SSP 308 or 310 on each of the communication lines (phone numbers) corresponding to a digital companion customer. In this manner, a trigger is set to detect communications received at the SSP that are directed to telephone numbers of digital companion customers.

After intercepting the communication, SSP 308 or 310 sends a query to ISCP 302 requesting further instructions. In response, ISCP 302 sends call information to a network access server 410 (step 624). In one embodiment, the call information may be sent to network access server 410 via a Generic Data Interface (GDI), using a message structure associated with GDI (e.g., GetData, SendData, or InvokeApp). The call information sent to network access server 410 may also be sent in an encrypted form.

The call information may include, for example, call state data, a call intercept parameter, a voice mail parameter, time zone data, user ID, called number data, calling name data, calling number data, and calling party number (CPN) presentation information. One of ordinary skill in the art will appreciate that additional information may be included with the call information, or that some of the previously noted information may be omitted from the call information.

Call state data may provide the current call state based on processing (e.g., AIN processing) that has already occurred for the call. For example, some possible values for call state data may be indicative of a call being authorized for termination, a call being to a call intercept (CI) service node or IP, a call being from a CI service node or IP, a call being a priority call from the CI service node or IP, a call having a CI error encountered on a call to a CI service node or IP, or a call being on the first leg of a click-to-dial call.

The call intercept parameter identifies when a customer has subscribed to the call intercept feature. In one embodiment, a call intercept feature allows a customer to block calls originating from unidentified callers that typically appear on a caller ID display as "unavailable", "private," "anonymous" or "out of area". The feature may tell callers that unidentified calls are not accepted and ask them to record a name. If an unidentified caller does not record a name or enter an override code, the called party's phone will not ring, thus eliminating interruptions from unidentified callers.

The voice mail parameter identifies when a user has subscribed to the voice mail feature. Time zone data refers to the customer's time zone. Called number data refers to the telephone number of a called device associated with the user. User ID refers to a parameter that may have one of two values. If the user has subscribed to the distinctive ring feature, then user ID is set to a primary number value. If no such feature is subscribed to, then user ID is set to the same value as the called number. The distinctive ring feature, for example, may associate multiple telephone numbers with a single communication device, with each number having a unique ringing pattern. A customer's primary number is the main number associated with the line.

Calling number data refers to the number of the caller. This parameter may contain such a number when it is available. In addition, the parameter may contain a calling party address when the information is made available by a previously executed AIN service. Otherwise, the calling number parameter may include some arbitrary string of digits or characters (e.g., ten zeros) when the caller ID information does or does not match a particular format.

Calling name data refers to the name of the calling party. This parameter may be retrieved, for example, by ISCP 302 from a database such as LIDB 312. It may typically be possible to retrieve the calling name when the database was populated with this data by a previously executed AIN service. If the calling name is not successfully retrieved, then the calling name parameter may include, for example, an arbitrary string of digits or characters (e.g., zeros) indicative of situations in which there was either no response from LIDB 312, an erroneous response was returned from LIDB 312, no name was returned from LIDB 312, the format of the caller ID is not in conformance, or the caller ID presentation is restricted.

Upon receiving the call information from ISCP 302, network access server 410 may decrypt the information, if necessary, and forward the received information to application server 516 (step 626). Application server 516 may then retrieve call preference information of the called party from a database (step 628). In one embodiment, the database storing this call preference information may be database 522, customer profile database 532, or another database used to stored customer-related data. The call preference information may include, for example, call block lists, lists of forwarding devices or telephone numbers, voice mail preferences, lists of recordings that the customer can set as pre-recorded messages, etc. Thereafter, application server 516 may determine the preferred device of the called party in a manner similar to that described above with reference to step 610 (step 630).

Next, application server 516 determines whether the called party is in a Do Not Disturb mode (step 632). If the called party is in a Do Not Disturb mode, then application server 516 causes the communication from the calling party to be routed to voice mail (step 634). One of ordinary skill in the art will appreciate that other actions may be taken instead of sending the communication to voice mail. For example, a recording may be provided to the calling party that does not allow for the calling party to leave a message.

If application server 516 determines that the called party is not in a Do Not Disturb mode, then application server 516 may determine whether a new mode of delivery is required (step 636). A new mode of delivery to the preferred device of the called party may be needed, for example, if the calling party's current device is using a format that differs from the format required by the called party's preferred device. For example, if the called party's preferred device is a pager or SMS device and the calling party is using a wireline phone, then a call cannot be completed as though two phones were communicating with each other. Instead, if possible, a phone number would need to be left in the case of a pager, and an SMS message would need to be sent in the case of an SMS device.

If a new mode of delivery is not required, then application server 516 causes the communication to be routed to the called party's preferred device (step 638). For example, application server 516 may send to ISCP 302, via network access server 410, information reflective of the preferred device of the called party. In response, ISCP 302 may instruct a switch associated with the called party's preferred device (e.g., SSP 308 or 310) to send the communication to the preferred device. Thereafter, the calling party and called party may communicate with each other.

If a new mode of delivery is required, then application server 516 may send the device of the calling party a request for a new mode of delivery (step 640). The type of incoming data associated with the communication to the calling party may be changed to match the type of data required for the called party's preferred device. More particularly, application server 516 may prompt the calling party to enter information pertaining to a new mode of delivery dependent on the type of preferred device. For example, if the preferred device of the called party is currently a pager, then application server 516 may prompt the calling party to enter a number at which the calling party can be reached. If the preferred device of the called party is an SMS device, then application server 516 may prompt the calling party to enter an SMS message. More generally, application server 516 may provide a user interface to the calling party that presents the calling party with an appropriate overlay to communicate with the called party's preferred device. For example, if the called party's preferred device is an SMS device, application server 516 may provide the calling party an overlay permitting the calling party to enter an SMS message. One of ordinary skill in the art will appreciate that application server 516 may prompt a calling party for other types of information other than those explicitly set forth above.

In response, the device being used by the calling party may send information pertaining to the requested new mode of delivery to application server 516 (step 642). This information may be, for example, a phone number, an SMS message, an e-mail, etc. Alternatively, application server 516 may not need to prompt the calling party for a new mode of delivery. Instead, application server 516 may already have access to information needed for the new mode. For example, application server 516 may already know the telephone number of the calling party from the previously received call information. This may eliminate the need to request a telephone number from the calling party when one is needed for a new mode of delivery. Regardless of whether information pertaining to the new mode of delivery is provided by the calling party or automatically ascertained, the communication is thereafter routed to the called party's preferred device in the new mode of delivery (step 644).

Figure 7:
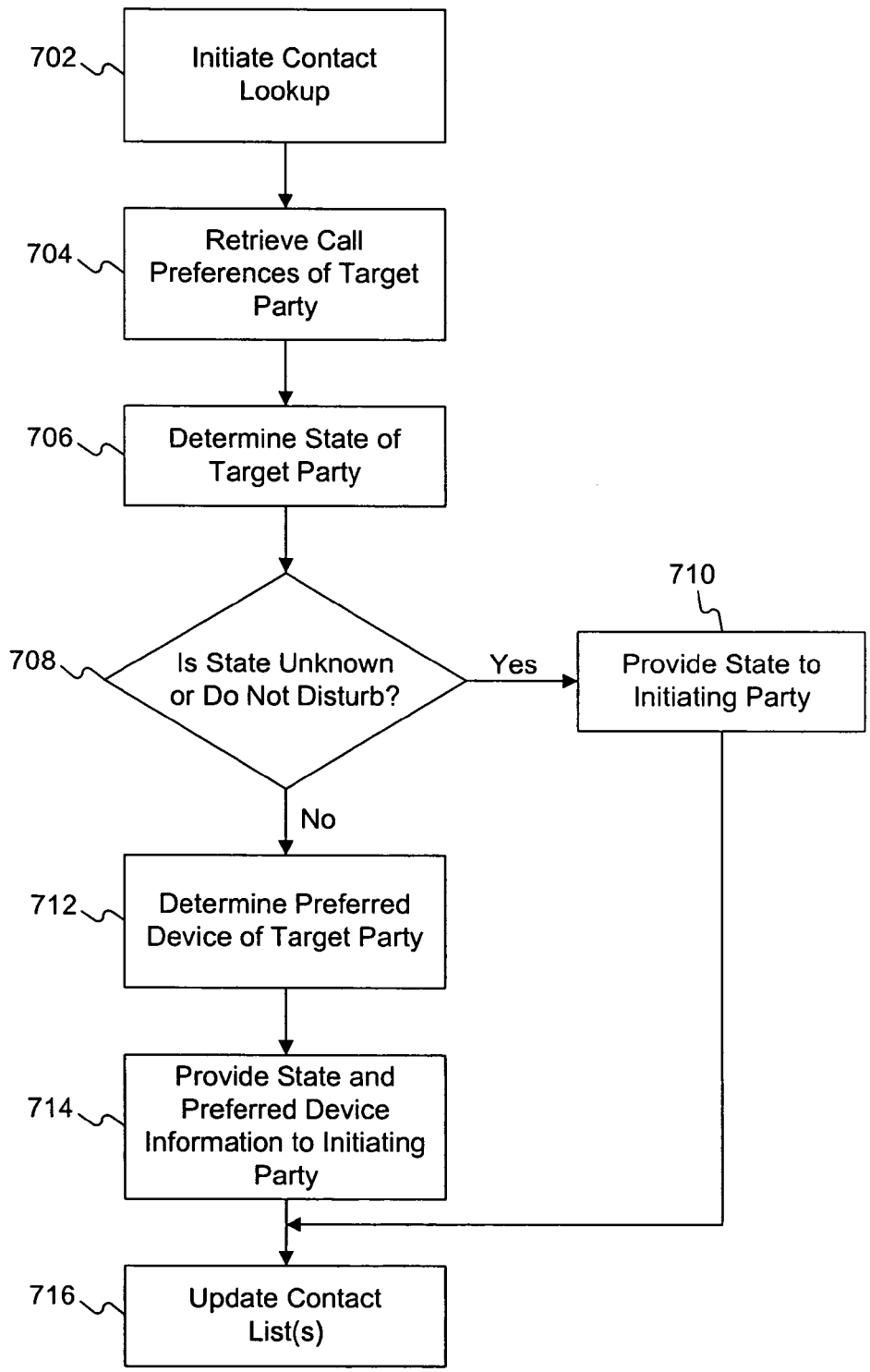
FIG. 7 is a diagram of an exemplary flowchart of a method for looking up the preferred device of a customer consistent with the principles of the present invention.

FIG. 7 is a diagram of an exemplary flowchart of a method for looking up the preferred device of a customer consistent with the principles of the present invention. Although the steps of the flowchart are described in a particular order, one skilled in the art will appreciate that these steps may be performed in a modified or different order. Further, one or more of the steps in FIG. 7 may be performed concurrently or in parallel.

First, a digital companion customer initiates a contact lookup (step 702). A digital companion customer may initiate such a lookup, for example, if the customer wishes to communicate with a party in a contact list at a later time or otherwise needs information on the party. For the purposes of this discussion, assume that the party being looked up (e.g., target party) is also a digital companion customer. When a contact lookup is initiated, the initiating party may utilize a device, such as a user terminal 112, to access the initiating party's address book or other contact list. Such an address book or contact list may be located, for example, in database 522 or contacts database 530. Once the initiating party has identified the target party, application server 516 may proceed to retrieve the call preferences of the target party (step 704). For example, application server 516 may retrieve call preference information from database 522, customer profile database 532, or another database used to store customer-related data. The call preference information may include, for example, call block lists, lists of forwarding devices or telephone numbers, voice mail preferences, lists of recordings that the customer can set as pre-recorded messages, etc.

Application server 516 may also determine the current state of the target party (step 706). The state may refer to the current status of communication lines associated with the target party. For example, communication lines associated with a target party may be blocked, busy, available, or unknown. A blocked (e.g., Do Not Disturb) state may indicate that a party associated with the state does not currently wish to be contacted. A busy state may indicate that the communication line associated with the target party is currently in use. An available state may indicate that the line is currently not in use. An unknown state may indicate that the status cannot be determined or the target party does not wish to advertise line state. State may be determined in a number of ways. For example, if the state of a line is Do Not Disturb, then the user preferences of the appropriate customer may have a Do Not Disturb indicator associated with them. Accordingly, application server 516 would know that the customer and lines associated with the customer are in a Do Not Disturb state. Similar indicators may be used to denote a busy or available state. If the user preferences of the target party has no indicator associated with them or the state cannot not otherwise be determined, application server 516 may determine the state to be unknown.

If application server 516 determines that the state is Do Not Disturb (e.g., blocked) or unknown (step 708—Yes), then application server 516 provides an indication of the state to the initiating party (step 710). For example, application server 516 may cause displayed contact information on the target party to be accompanied by a displayed indicator of the state. More particularly, different colors may be associated with different line states. An exemplary color scheme may associate red with a Do Not Disturb state, orange with a busy state, green with an available state, and black with an unknown state. One of ordinary skill in the art will appreciate that other schemes may be used to show line states. For example, different colors, shapes, numbers, words, symbols, etc. may all be used instead of or in addition to the aforementioned color scheme. In step 710, because the state is unknown (e.g., all of the lines associated with the target party are unknown) or Do Not Disturb, there is no current preferred device for the target party, and only the state is provided to the initiating party. An unknown state may also indicate that the state of one of the lines of a customer is unknown as opposed to all of the lines. In such a case, it may not be necessary to provide only the state to the initiating party (e.g., there is a valid preferred device).

If application server 516 determines that the state is something other than unknown or Do Not Disturb (e.g., state is busy or available) (step 708—No), application server 516 proceeds to determine the preferred device of the target party in a manner similar to that described above in step 610 (step 712). Application server 516 then provides both an indication of the state and preferred device information to the initiating party (step 714). For example, application server 516 may cause displayed contact information on the target party to be accompanied by a displayed indicator of the state and information indicating which device belonging to the called party is currently the preferred device. Line state may be displayed in a manner similar to that described above with reference to step 710. In this case, preferred device information is provided to the initiating party because the target party has a preferred device and is accepting calls.

After providing the state and/or preferred device information to the initiating party, application server 516 may update the contact list (e.g., address book) of the initiating party so that the state and preferred device are stored with the entry for the target party (step 716). Address books of other digital companion customers having the target party as an entry may also be updated, if, for example, the target party previously provided the other customers a vCard or some other means of automatically populating an address book.

Figure 8:
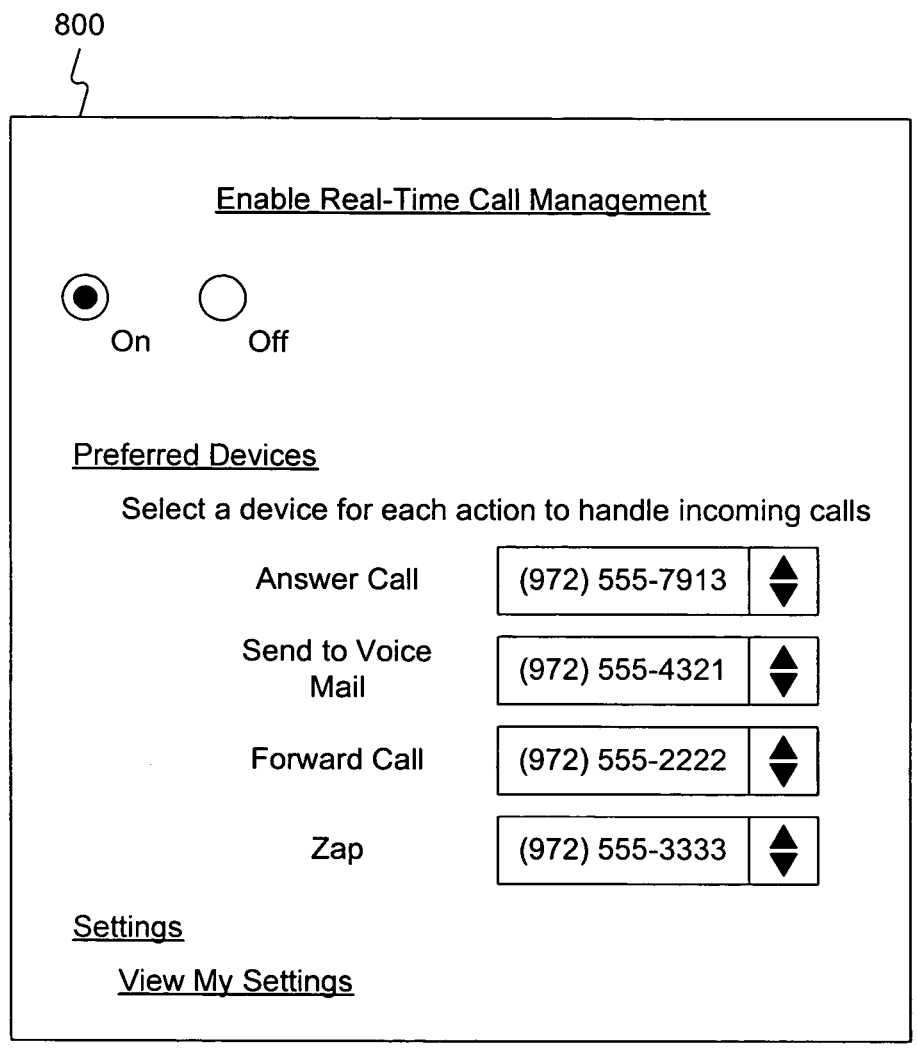
FIG. 8 is a diagram of an exemplary user interface 800 that enables a customer to change preferences consistent with the present invention.

FIG. 8 is a diagram of an exemplary user interface 800 that enables a customer to change preferences consistent with the present invention. As illustrated in FIG. 8, a customer may have the ability to enable or disable real-time call management for a given device. The customer also may select particular devices to handle different actions. For example, a customer may set specific phone numbers, each associated with one device, to handle features such as answer calls, send to voice mail, forward call, and/or telemarketer zap (e.g., call screening). One of ordinary skill in the art will appreciate that other features may also have phone numbers set for them. The customer also has the option of viewing various other settings associated with the customer, such as a list of numbers that are call blocked, call back settings, etc.

FIG. 9 is a diagram of an exemplary user interface 900 displaying a contact list accompanied by state and preferred device information consistent with the present invention. As illustrated in FIG. 9, a customer that performs a contact lookup may be presented with a contact list that includes line state and preferred device information. The list depicted in FIG. 9 shows that Jim has an available work line, an available home line, and a busy mobile line. The list also indicates that Jim's mobile phone is currently his preferred device. Steve and Bob, on the other hand, have Do Not Disturb and unknown states, respectively. Therefore, none of their devices are indicated as being a preferred device.

While the present invention has been described in connection with various embodiments, many modifications will be readily apparent to those skilled in the art. For example, although the methods and systems described above pertain to communications to a called party that is a digital companion customer, one of ordinary skill in the art will appreciate that modifications may be made so that communications may also be forwarded to called parties that are not digital companion customers. For example, if the called party is not a digital companion customer, application server 516 may retrieve information reflective of the calling party's preference(s) for contacting the called party in order to determine a preferred device for the called party. This information may be tied to calendar information (e.g., time and/or day), priority information, default information, etc., so that application server 516 may choose from among one or more devices associated with the called party. In this manner, for example, dependent on the time of day or another factor, a particular one of the called party's devices may be set as the preferred device.

One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. Accordingly, embodiments of the invention are not limited to the above described embodiments and examples, but instead is defined by the appended claims in light of their full scope of equivalents.

What is claimed is:

1. A method for routing a communication to a preferred device, comprising:
    receiving information pertaining to a communication from a calling party to a device associated with a user being contacted by the calling party;
    retrieving data corresponding to the user being contacted by the calling party using the information pertaining to the communication;
    retrieving data corresponding to the calling party;
    determining a preferred device of the user being contacted by the calling party based on the retrieved data corresponding to the user;
    determining a preferred device of the calling party from a plurality of devices associated with the calling party based on the retrieved data corresponding to the calling party;
    determining whether the preferred device of the user being contacted by the calling party requires a different data format than the preferred device of the calling party;
    automatically sending contact information identifying the preferred device of the calling party to the preferred device of the user being contacted by the calling party in the data format of the preferred device of the user in response to the determination that the preferred device of the user being contacted by the calling party requires a different data format than the preferred device of the calling party;
    establishing a communication between the preferred device of the user being contacted by the calling party and the preferred device of the calling party in response to the determination that the preferred device of the user being contacted by the calling party does not require a different data format than the preferred device of the calling party; and
    when unable to establish the communication between the preferred device of the user being contacted by the calling party and the preferred device of the calling party, sending information indicating that the calling party should contact the preferred device of the user being contacted by the calling party to the preferred device of the calling party.

2. The method of claim 1, wherein retrieving data corresponding to the user comprises:
    accessing a database for call preference information corresponding to the user.

3. The method of claim 2, wherein the call preference information comprises an indication of a device to which communications should be forwarded.

4. The method of claim 2, wherein determining a preferred device of the user comprises:
    specifying the preferred device of the user to be a device indicated in the call preference information.

5. The method of claim 1, wherein determining a preferred device of the user comprises:
    specifying the preferred device of the user to be a predetermined default device.

6. The method of claim 1, wherein determining a preferred device of the user comprises:
    specifying the preferred device of the user to be a device last used by the user.

7. The method of claim 1, wherein determining a preferred device of the user comprises:
    specifying the preferred device of the user based on information reflecting a time period during which a particular device is the preferred device of the user.

8. The method of claim 1, comprising:
    determining whether the user is associated with a do not disturb mode.

9. The method of claim 8, comprising:
    routing the communication to voice mail based on a determination that the user is associated with a do not disturb mode.

10. The method of claim 1, comprising:
    routing the communication to the preferred device of the user without reformatting the communication if the preferred device of the user does not require a different data format.

11. The method of claim 1, wherein the data format of the preferred device of the calling party comprises voice data and the data format of the preferred device of the user comprises text data, or vice versa.

12. The method of claim 1, further comprising:
    sending a request for the data format of the preferred device of the calling party.

13. The method of claim 12, wherein sending a request comprises:
    presenting an appropriate overlay to communicate with the preferred device of the user.

14. The method of claim 12, comprising:
    providing the preferred device of the calling party with a graphical interface for use in entering the communication.

15. The method of claim 1, further comprising:
    automatically converting incoming data associated with the communication to new incoming data with the data format of the preferred device of the user.

16. The method of claim 1, wherein determining a preferred device of the user comprises:
    specifying the preferred device of the user based on information reflecting the user's location.

17. The method of claim 1, wherein receiving information pertaining to a communication comprises:
    detecting at a switch in a voice network a communication from the calling party directed to the user at a calling number associated with the user; and
    intercepting the communication upon detecting an intercept trigger associated with the communication.

18. A method for routing a communication to a preferred device, comprising:
    receiving from a calling party on a data network, information pertaining to a communication to a user from the calling party;
    retrieving data corresponding to the user using the information pertaining to the communication;
    retrieving data corresponding to the calling party;
    determining a preferred device of the user based on the retrieved data corresponding to the user;

determining a preferred device of the calling party from a plurality of devices associated with the calling party based on the retrieved data corresponding to the calling party;
determining whether the preferred device of the user requires a different data format than the preferred device of the calling party;
providing a user interface to the calling party to enter a message in the data format of the preferred device of the user in response to the determination that the preferred device of the user requires a different data format than the preferred device of the calling party;
establishing a communication between the preferred device of the user being contacted by the calling party and the preferred device of the calling party in response to the determination that the preferred device of the user being contacted by the calling party does not require a different data format than the preferred device of the calling party; and
when unable to establish the communication between the preferred device of the user being contacted by the calling party and the preferred device of the calling party, sending information indicating that the calling party should contact the preferred device of the user being contacted by the calling party to the preferred device of the calling party.

19. The method of claim 18, wherein the calling party initiates the communication by clicking on a hyperlink.

20. The method of claim 18, wherein retrieving data corresponding to the user comprises:
obtaining, from a database, call preference information corresponding to the user.

21. The method of claim 20, wherein the call preference information comprises an indication of a device to which communications should be forwarded.

22. The method of claim 20, wherein determining a preferred device of the user comprises:
specifying the preferred device of the user to be a device indicated in the call preference information.

23. The method of claim 18, wherein determining a preferred device of the user comprises:
specifying the preferred device of the user to be a predetermined default device.

24. The method of claim 18, wherein determining a preferred device of the user comprises:
specifying the preferred device of the user to be a device last used by the user.

25. The method of claim 18, wherein determining a preferred device of the user comprises:
specifying the preferred device of the user based on information reflecting a time period during which a particular device is the preferred device of the user.

26. The method of claim 18, wherein determining a preferred device of the user comprises:
specifying the preferred device of the user based on information reflecting the user's location.

27. The method of claim 18, wherein determining a preferred device of the calling party comprises:
specifying the preferred device of the calling party based on information reflecting the calling party's location.

28. The method of claim 18, wherein retrieving data corresponding to the calling party comprises:
accessing a database for call preference information corresponding to the calling party.

29. The method of claim 28, wherein the call preference information corresponding to the calling party comprises an indication of a device to which communications to the calling party should be forwarded.

30. The method of claim 18, wherein determining a preferred device of the calling party comprises:
specifying the preferred device of the calling party to be a device indicated in the call preference information.

31. The method of claim 18, wherein determining a preferred device of the calling party comprises:
specifying the preferred device of the calling party to be a predetermined default device.

32. The method of claim 31, wherein the predetermined default device is the device used by the calling party.

33. The method of claim 18, wherein determining a preferred device of the calling party comprises:
specifying the preferred device of the calling party to be a device last used by the calling party.

34. The method of claim 18, wherein determining a preferred device of the calling party comprises:
specifying the preferred device of the calling party based on information reflecting a time period during which a particular device is the preferred device of the calling party.

35. The method of claim 18, comprising:
determining whether the user is associated with a do not disturb mode.

36. The method of claim 35, comprising:
routing the communication to voice mail based on a determination that the user is associated with a do not disturb mode.

37. The method of claim 18, wherein the data format of the preferred device of the calling party comprises voice data and the data format of the preferred device of the user comprises text data, or vice versa.

38. The method of claim 37, further comprising:
sending a request for the data format of the preferred device of the calling party.

39. The method of claim 38, wherein sending a request comprises:
presenting an appropriate overlay to communicate with the preferred device of the user.

40. The method of claim 38, comprising:
providing the preferred device of the calling party with a graphical interface for use in entering the communication.

41. The method of claim 18, further comprising:
automatically converting incoming data associated with the communication to new incoming data with the data format of the preferred device of the user.

42. An apparatus for routing a communication to a preferred device, comprising:
means for receiving information pertaining to a communication from a calling party to a device associated with a user being contacted by the calling party;
means for retrieving data corresponding to the user being contacted by the calling party using the information pertaining to the communication;
means for retrieving data corresponding to the calling party;
means for determining a preferred device of the user being contacted by the calling party based on the retrieved data corresponding to the user;
means for determining a preferred device of the calling party from a plurality of devices associated with the calling party based on the retrieved data corresponding to the calling party;

means for determining whether the preferred device of the user being contacted by the calling party requires a different data format than the preferred device of the calling party;

means for automatically sending contact information identifying the preferred device of the calling party to the preferred device of the user being contacted by the calling party in the data format of the preferred device of the user in response to the determination that the preferred device of the user being contacted by the calling party requires a different data format than the preferred device of the calling party;

means for establishing a communication between the preferred device of the user being contacted by the calling party and the preferred device of the calling party in response to the determination that the preferred device of the user being contacted by the calling party does not require a different data format than the preferred device of the calling party, and means for, when unable to establish the communication between the preferred device of the user being contacted by the calling party and the preferred device of the calling party, sending information indicating that the calling party should contact the preferred device of the user being contacted by the calling party to the preferred device of the calling party.

43. The apparatus of claim 42, wherein the means for retrieving data corresponding to the user comprises:
means for accessing a database for call preference information corresponding to the user.

44. The apparatus of claim 43, wherein the call preference information comprises an indication of a device to which communications should be forwarded.

45. The apparatus of claim 43, wherein the means for determining a preferred device of the user comprises:
means for specifying the preferred device of the user to be a device indicated in the call preference information.

46. The apparatus of claim 42, wherein the means for determining a preferred device of the user comprises:
means for specifying the preferred device of the user to be a predetermined default device.

47. The apparatus of claim 42, wherein the means for determining a preferred device of the user comprises:
means for specifying the preferred device of the user to be a device last used by the user.

48. The apparatus of claim 42, wherein the means for determining a preferred device of the user comprises:
means for specifying the preferred device of the user based on information reflecting a time period during which a particular device is the preferred device of the user.

49. The apparatus of claim 42, comprising:
means for determining whether the user is associated with a do not disturb mode.

50. The apparatus of claim 49, comprising:
means for routing the communication to voice mail based on a determination that the user is associated with a do not disturb mode.

51. The apparatus of claim 42, wherein the means for routing comprises:
means for forwarding the communication to the preferred device of the user without reformatting the communication if the preferred device of the user does not require a different data format.

52. The apparatus of claim 42, wherein the data format of the preferred device of the calling party comprises voice data and the data format of the preferred device of the user comprises text data, or vice versa.

53. The apparatus of claim 42, comprising:
means for sending a request for the data format of the preferred device of the calling party.

54. The apparatus of claim 53, wherein the means for sending a request comprises:
means for presenting an appropriate overlay to communicate with the preferred device of the user.

55. The apparatus of claim 53, comprising:
means for providing the preferred device of the calling party with a graphical interface for use in entering the communication.

56. The apparatus of claim 52, comprising:
means for automatically converting incoming data associated with the communication to new incoming data with a the data format of the preferred device of the user.

57. The apparatus of claim 42, wherein the means for determining a preferred device of the user comprises:
means for specifying the preferred device of the user based on information reflecting the user's location.

58. The apparatus of claim 42, wherein the means for receiving information pertaining to a communication comprises:
means for detecting at a switch in a voice network a communication from the calling party directed to the user at a calling number associated with the user; and
means for intercepting the communication upon detecting an intercept trigger associated with the communication.

59. An apparatus for routing a communication to a preferred device, comprising:
means for receiving from a calling party on a data network, information pertaining to a communication to a user from the calling party;
means for retrieving data corresponding to the user using the information pertaining to the communication;
means for retrieving data corresponding to the calling party;
means for determining a preferred device of the user based on the retrieved data corresponding to the user;
means for determining a preferred device of the calling party from a plurality of devices associated with the calling party based on the retrieved data corresponding to the calling party;
means for determining whether the preferred device of the user requires a different data format than the preferred device of the calling party;
means for providing a user interface to the calling party to enter a message in the data format of the preferred device of the user in response to the determination that the preferred device of the user requires a different data format than the preferred device of the calling party;
means for establishing a communication between the preferred device of the user being contacted by the calling party and the preferred device of the calling party in response to the determination that the preferred device of the user being contacted by the calling party does not require a different data format than the preferred device of the calling party; and
means for, when unable to establish the communication between the preferred device of the user being contacted by the calling party and the preferred device of the calling party, sending information indicating that the calling party should contact the preferred device of the user being contacted by the calling party to the preferred device of the calling party.

60. The apparatus of claim 59, wherein the calling party initiates the communication by clicking on a hyperlink.

61. The apparatus of claim 59, wherein the means for retrieving data corresponding to the user comprises:
 means for accessing a database for call preference information corresponding to the user.

62. The apparatus of claim 61, wherein the call preference information comprises an indication of a device to which communications should be forwarded.

63. The apparatus of claim 61, wherein the means for determining a preferred device of the user comprises:
 means for specifying the preferred device of the user to be a device indicated in the call preference information.

64. The apparatus of claim 59, wherein the means for determining a preferred device of the user comprises:
 means for specifying the preferred device of the user to be a predetermined default device.

65. The apparatus of claim 59, wherein the means for determining a preferred device of the user comprises:
 means for specifying the preferred device of the user to be a device last used by the user.

66. The apparatus of claim 59, wherein the means for determining a preferred device of the user comprises:
 means for specifying the preferred device of the user based on information reflecting a time period during which a particular device is the preferred device of the user.

67. The apparatus of claim 59, wherein the means for determining a preferred device of the user comprises:
 means for specifying the preferred device of the user based on information reflecting the user's location.

68. The apparatus of claim 59, wherein the means for determining a preferred device of the calling party comprises:
 means for specifying the preferred device of the calling party based on information reflecting the calling party's location.

69. The apparatus of claim 59, wherein the means for retrieving data corresponding to the calling party comprises:
 means for accessing a database for call preference information corresponding to the calling party.

70. The apparatus of claim 69, wherein the call preference information corresponding to the calling party comprises an indication of a device to which communications to the calling party should be forwarded.

71. The apparatus of claim 59, wherein the means for determining a preferred device of the calling party comprises:
 means for specifying the preferred device of the calling party to be a device indicated in the call preference information.

72. The apparatus of claim 59, wherein the means for determining a preferred device of the calling party comprises:
 means for specifying the preferred device of the calling party to be a predetermined default device.

73. The apparatus of claim 72, wherein the predetermined default device is the device used by the calling party.

74. The apparatus of claim 59, wherein the means for determining a preferred device of the calling party comprises:
 means for specifying the preferred device of the calling party to be a device last used by the calling party.

75. The apparatus of claim 59, wherein the means for determining a preferred device of the calling party comprises:
 means for specifying the preferred device of the calling party based on information reflecting a time period during which a particular device is the preferred device of the calling party.

76. The apparatus of claim 59, comprising:
 means for determining whether the user is associated with a do not disturb mode.

77. The apparatus of claim 76, comprising:
 means for routing the communication to voice mail based on a determination that the user is associated with a do not disturb mode.

78. The apparatus of claim 59, wherein the data format of the preferred device of the calling party comprises voice data and the data format of the preferred device of the user comprises text data, or vice versa.

79. The apparatus of claim 78, further comprising:
 means for sending a request for the data format of the preferred device of the calling party.

80. The apparatus of claim 79, wherein the means for sending a request comprises:
 means for presenting an appropriate overlay to communicate with the preferred device of the user.

81. The apparatus of claim 79, comprising:
 means for providing the preferred device of the calling party with a graphical interface for use in entering the communication.

82. The apparatus of claim 59, further comprising:
 means for automatically converting incoming data associated with the communication to new incoming data with the data format of a preferred device of the user.

83. An apparatus for routing a communication to a preferred device, comprising:
 a memory having a program that:
  receives information pertaining to a communication from a calling party to a device associated with a user being contacted by the calling party,
  retrieves data corresponding to the user being contacted by the calling party using the information pertaining to the communication,
  retrieves data corresponding to the calling party;
  determines a preferred device of the user being contacted by the calling party based on the retrieved data corresponding to the user,
  determines a preferred device of the calling party from a plurality of devices associated with the calling party based on the retrieved data corresponding to the calling party;
  determines whether the preferred device of the user being contacted by the calling party requires a different data format than the preferred device of the calling party,
  automatically sends contact information identifying the preferred device of the calling party to the preferred device of the user being contacted by the calling party in the data format of the preferred device of the user in response to the determination that the preferred device of the user being contacted by the calling party requires a different data format than the preferred device of the calling party,
  establishes a communication between the preferred device of the user being contacted by the calling party and the preferred device of the calling party in response to the determination that the preferred device of the user being contacted by the calling party does not require a different data format than the preferred device of the calling party, and
  when unable to establish the communication between the preferred device of the user being contacted by the calling party and the preferred device of the calling party, sends information indicating that the calling party should contact the preferred device of the user being contacted by the calling party to the preferred device of the calling party; and
 a processor that runs the program.

84. An apparatus for routing a communication to a preferred device, comprising:
a memory having a program that:
receives from a calling party on a data network, information pertaining to a communication to a user from a calling party,
retrieves data corresponding to the user using the received information pertaining to the communication,
retrieves data corresponding to the calling party;
determines a preferred device of the user based on the retrieved data corresponding to the user,
determines a preferred device of the calling party from a plurality of devices associated with the calling party based on the retrieved data corresponding to the calling party,
determines whether the preferred device of the user requires a different data format than the preferred device of the calling party,
provides a user interface to enter a message in the data format of the preferred device of the user in response to the determination that the preferred device of the user requires a different data format than the preferred device of the calling party,
establishes a communication between the preferred device of the user being contacted by the calling party and the preferred device of the calling party in response to the determination that the preferred device of the user being contacted by the calling party does not require a different data format than the preferred device of the calling party, and
when unable to establish the communication between the preferred device of the user being contacted by the calling party and the preferred device of the calling party, sends information indicating that the calling party should contact the preferred device of the user being contacted by the calling party to the preferred device of the calling party; and
a processor that runs the program.

85. A non-transitory computer-readable medium encoded with instructions which, when executed by a computer, perform a method for routing a communication to a preferred device, the method comprising:
receiving information pertaining to a communication from a calling party to a device associated with a user being contacted by the calling party;
retrieving data corresponding to the user being contacted by the calling party using the information pertaining to the communication;
retrieving data corresponding to the calling party;
determining a preferred device of the user being contacted by the calling party based on the retrieved data;
determining a preferred device of the calling party from a plurality of devices associated with the calling party based on the retrieved data corresponding to the calling party;
determining whether the preferred device of the user being contacted by the calling party requires a different data format than the preferred device of the calling party;
automatically sending contact information identifying the preferred device of the calling party to the preferred device of the user being contacted by the calling party in the data format of the preferred device of the user in response to the determination that the preferred device of the user being contacted by the calling party requires a different data format than the preferred device of the calling party;
establishing a communication between the preferred device of the user being contacted by the calling party and the preferred device of the calling party in response to the determination that the preferred device of the user being contacted by the calling party does not require a different data format than the preferred device of the calling party; and
when unable to establish the communication between the preferred device of the user being contacted by the calling party and the preferred device of the calling party, sending information indicating that the calling party should contact the preferred device of the user being contacted by the calling party to the preferred device of the calling party.

86. A non-transitory computer-readable medium encoded with instructions which, when executed by a computer, perform a method for routing a communication to a preferred device, the method comprising:
receiving from a calling party on a data network, information pertaining to a communication to a user from a calling party;
retrieving data corresponding to the user using the information pertaining to the communication;
retrieving data corresponding to the calling party;
determining a preferred device of the user based on the retrieved data corresponding to the user;
determining a preferred device of the calling party from a plurality of devices associated with the calling party based on the retrieved data corresponding to the calling party;
determining whether the preferred device of the user requires a different data format than the preferred device of the calling party;
providing a user interface to the calling party to enter a message in the data format of the preferred device of the user in response to the determination that the preferred device of the user requires a different data format than the preferred device of the calling party;
establishing a communication between the preferred device of the user being contacted by the calling party and the preferred device of the calling party in response to the determination that the preferred device of the user being contacted by the calling party does not require a different data format than the preferred device of the calling party; and
when unable to establish the communication between the preferred device of the user being contacted by the calling party and the preferred device of the calling party, sending information indicating that the calling party should contact the preferred device of the user being contacted by the calling party to the preferred device of the calling party.

87. An apparatus for routing a communication to a preferred device, comprising:
a first server operable to:
receive information pertaining to a communication from a calling party to a device associated with a user being contacted by the calling party,
retrieve data corresponding to the user being contacted by the calling party using the information pertaining to the communication,
retrieve data corresponding to the calling party,
determine a preferred device of the user being contacted by the calling party based on the retrieved data corresponding to the user, determine a preferred device of the calling party from a plurality of devices associated with the calling party based on the retrieved data corresponding to the calling party, and determine whether the preferred device of the user being contacted by the calling party requires a different data format than the preferred device of the calling party; and a second server operable to:

automatically send contact information identifying the preferred device of the calling party to the preferred device of the user being contacted by the calling party in the data format of the preferred device of the user in response to the determination the preferred device of the user being contacted by the calling party requires a different data format than the preferred device of the calling party, establish a communication between the preferred device of the user being contacted by the calling party and the preferred device of the calling party in response to the determination that the preferred device of the user being contacted by the calling party does not require a different data format than the preferred device of the calling party, and when unable to establish the communication between the preferred device of the user being contacted by the calling party and the preferred device of the calling party, send information indicating that the calling party should contact the preferred device of the user being contacted by the calling party to the preferred device of the calling party.

88. An apparatus for routing a communication to a preferred device, comprising:

a first server operable to:

receive from a calling party on a data network, information pertaining to a communication to a user from a calling party, retrieve data corresponding to the user using the received information pertaining to the communication, retrieve data corresponding to the calling party, determine a preferred device of the user based on the retrieved data corresponding to the user, determine a preferred device of the calling party from a plurality of devices associated with the calling party based on the retrieved data corresponding to the calling party, determine whether the preferred device of the user requires a different data format than the preferred device of the calling party, and a second server operable to:

providing a user interface to the calling party to enter a message in the data format of the preferred device of the user in response to the determination that the preferred device of the user requires a different data format than the preferred device of the calling party, establish a communication between the preferred device of the user being contacted by the calling party and the preferred device of the calling party in response to the determination that the preferred device of the user being contacted by the calling party does not require a different data format than the preferred device of the calling party; and when unable to establish the communication between the preferred device of the user being contacted by the calling party and the preferred device of the calling party, send information indicating that the calling party should contact the preferred device of the user being contacted by the calling party to the preferred device of the calling party.

89. A system for routing a communication to a preferred device, comprising:

a voice network;

a data network; and a service center operable to:

receive information pertaining to a communication from a calling party to a device associated with a user being contacted by the calling party;

retrieve data corresponding to the user being contacted by the calling party using the information pertaining to the communication;

retrieve data corresponding to the calling party;

determine a preferred device of the user being contacted by the calling party based on the retrieved data corresponding to the user;

determine a preferred device of the calling party from a plurality of devices associated with the calling party based on the retrieved data corresponding to the calling party;

determine whether the preferred device of the user being contacted by the calling party requires a different data format than the preferred device of the calling party;

automatically send contact information identifying the preferred device of the calling party to the preferred device of the user being contacted by the calling party in the data format of the preferred device of the user in response to the determination that the preferred device of the user being contacted by the calling party requires a different data format than the preferred device of the calling party;

establish a communication between the preferred device of the user being contacted by the calling party and the preferred device of the calling party in response to the determination that the preferred device of the user being contacted by the calling party does not require a different data format than the preferred device of the calling party; and when unable to establish the communication between the preferred device of the user being contacted by the calling party and the preferred device of the calling party, send information indicating that the calling party should contact the preferred device of the user being contacted by the calling party to the preferred device of the calling party.

90. A system for routing a communication to a preferred device, comprising:

a voice network;

a data network; and a service center operable to:

receive from a calling party on a data network, information pertaining to a communication to the user from a calling party;

retrieve data corresponding to the user using the received information pertaining to the communication;

retrieve data corresponding to the calling party;

determine a preferred device of the user based on the retrieved data corresponding to the user;

determine a preferred device of the calling party from a plurality of devices associated with the calling party based on the retrieved data corresponding to the calling party;

determine whether the preferred device of the user requires a different data format than the preferred device of the calling party;

provide a user interface to the calling party to enter a message in the data format of the preferred device of the user in response to the determination that the preferred device of the user requires a different data format than the preferred device of the calling party, establish a communication between the preferred device of the user being contacted by the calling party and the preferred device of the calling party in response to the determination that the preferred device of the user being contacted by the calling party does not require a different data format than the preferred device of the calling party; and when unable to establish the communication between the preferred device of the user being contacted by the calling party and the preferred device of the calling party, send information indicating that the calling party should contact the preferred device of the user being contacted by the calling party to the preferred device of the calling party.

\* \* \* \* \*